United States Patent
Onaka

(10) Patent No.: US 9,413,462 B2
(45) Date of Patent: Aug. 9, 2016

(54) OPTICAL AMPLIFICATION REPEATER AND OPTICAL TRANSMISSION STATION

(71) Applicant: FUJITSU LIMITED, Kawasaki-shi, Kanagawa (JP)

(72) Inventor: Miki Onaka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/611,719

(22) Filed: Feb. 2, 2015

(65) Prior Publication Data

US 2015/0249314 A1 Sep. 3, 2015

(30) Foreign Application Priority Data

Mar. 3, 2014 (JP) ................................. 2014-040306

(51) Int. Cl.

| H01S 3/00 | (2006.01) |
|---|---|
| H04B 10/297 | (2013.01) |
| H04B 10/291 | (2013.01) |
| G02B 27/10 | (2006.01) |
| H01S 3/067 | (2006.01) |
| H01S 3/094 | (2006.01) |
| H01S 3/23 | (2006.01) |

(52) U.S. Cl.
CPC ........ H04B 10/2972 (2013.01); H04B 10/2918 (2013.01); *G02B 27/10* (2013.01); *H01S 3/06775* (2013.01); *H01S 3/094061* (2013.01); *H01S 3/2391* (2013.01)

(58) Field of Classification Search
CPC .............. H01S 3/091; H01S 3/094003; H01S 3/094061; H01S 3/10015

USPC .......................................... 359/341.2, 341.32
See application file for complete search history.

(56) References Cited

U.S. PATENT DOCUMENTS

| 5,801,878 A * | 9/1998 | Bourret et al. ........... 359/341.33 |
|---|---|---|
| 6,101,025 A * | 8/2000 | Naganuma ............... 359/341.33 |
| 6,532,104 B1 * | 3/2003 | Bayart ....................... 359/337.4 |
| 6,728,027 B2 * | 4/2004 | Rapp .................. H04B 10/2972 359/341.2 |
| 6,856,738 B2 * | 2/2005 | Kato .................. G02B 6/02009 385/123 |
| 7,941,049 B2 * | 5/2011 | Nakano et al. .................. 398/92 |
| 2002/0021489 A1 * | 2/2002 | Willets et al. ............ 359/341.32 |
| 2005/0206998 A1 | 9/2005 | Ito |
| 2010/0266284 A1 | 10/2010 | Zhu |
| 2012/0257272 A1 | 10/2012 | Yoshida et al. |

FOREIGN PATENT DOCUMENTS

| JP | 2004-288702 | 10/2004 |
|---|---|---|
| JP | 2010-252334 | 11/2010 |
| JP | 2011-109248 | 6/2011 |
| JP | 2012-222170 | 11/2012 |

* cited by examiner

*Primary Examiner* — Mark Hellner
(74) *Attorney, Agent, or Firm* — Fujitsu Patent Center

(57) ABSTRACT

An optical amplification repeater includes a first rare-earth-doped optical amplification medium which amplifies a first signal light to be transmitted to a downstream, a second rare-earth-doped optical amplification medium which amplifies a second signal light to be transmitted to an upstream, and a pump light split and guide unit configured to split a pump light transmitted together with any of the first and second signal lights and to guide the split pump light to each of the first and second rare-earth-doped optical amplification mediums.

16 Claims, 27 Drawing Sheets

FIG. 5

| AMPLIFICATION BAND [μm] | DOPED RARE EARTH ELEMENT | PUMP WAVELENGTH [μm] |
|---|---|---|
| 1.3 | Pr3+ | 0.98 1.02 |
| | Nd3+ | 0.8 |
| 1.49 | Tm3+ | 1.40 |
| | Er3+ | 0.98 1.48 |

TRANSMITTANCE CHARACTERISTIC
(REFLECTION CHARACTERISTIC)
OF OPTICAL FILTER #1

REFLECTION CHARACTERISTIC
(TRANSMITTANCE CHARACTERISTIC)
OF OPTICAL FILTER #1

TRANSMITTANCE CHARACTERISTIC
(REFLECTION CHARACTERISTIC)
OF OPTICAL FILTER #2

REFLECTION CHARACTERISTIC
(TRANSMITTANCE CHARACTERISTIC)
OF OPTICAL FILTER #2

OPTICAL AMPLIFICATION REPEATER AND OPTICAL TRANSMISSION STATION

CROSS-REFERENCE TO RELATED APPLICATION

This application is based upon and claims the benefit of priority of the prior Japanese Patent Application No. 2014-040306, filed on Mar. 3, 2014, the entire contents of which are incorporated herein by reference.

FIELD

The embodiments discussed herein are related to an optical amplification repeater and an optical transmission station.

BACKGROUND

As an example of an optical communication system, there is a passive optical network (PON) system. The PON system is provided with an optical multiplexer and demultiplexer (MUX/DMUX) that is an optical passive component. The optical MUX/DMUX is arranged between an optical line terminal (OLT) provided in a station such as a service provider and an optical network unit (ONU) provided in a house of a subscriber.

The optical MUX/DMUX is connected to the OLT with an optical fiber transmission line, splits a signal transmitted from the OLT into a plurality of signals according to the number of ONUs, and transmits the split signals to the respective ONUs. On the other hand, the optical signal transmitted from the respective ONUs are combined by the optical MUX/DMUX and transmitted to the OLT.

In recent years, as communication traffic is steeply increased and the number of subscribers is increased, the PON system is requested to increase in the number of optical splitting by the optical MUX/DMUX and to expand (or increase) a transmission distance and speed of an optical signal. In order to satisfy the request, it may be effective to apply an optical amplifier to the PON system. As an example of a technology relating to the PON system and the optical amplifier, there are technologies disclosed in JP 2004-288702 A, JP 2010-252334 A, JP 2011-109248 A, and JP 2012-222170 A.

In the PON system, an optical amplifier is applicable to one or both of the OLT and the ONU corresponding to terminal station(s) or a section between the OLT and the ONU.

However, in a case where an optical amplifier is applied to the OLT (or the ONU) corresponding to an optical transmission terminal station in order to preliminarily compensate transmission line loss and optical split loss at the transmission station, a significantly large optical power may be necessarily input to an optical fiber transmission line according to the optical transmission distance and the number of subscribers. As a result, the waveform of the optical signal may be deteriorated due to a non-linear effect of the optical fiber transmission line and a reception performance of the optical signal may be decreased.

Further, since the optical amplifier has an upper limit of the optical output power, a shortage in the output optical power may be possibly occurred depending on the optical transmission distance and the number of subscribers. Furthermore, in a case where an optical amplifier is applied to the ONU to amplify a signal light to be transmitted to the OLT, the optical amplifier would be necessarily provided for every ONU (that is, the number of subscribers).

Meanwhile, in a case where an optical amplifier is applied to the ONU (or the OLT) corresponding to an optical reception terminal station in order to compensate the transmission line loss and the optical split loss at the reception station, since a reception light being passively-damped in optical power is input to the reception optical amplifier, noise light component occurred in the reception optical amplifier would be increased, and therefore, the reception performance would be degraded. Further, in a case where an optical amplifier to amplify a reception light from the OLT is applied to the ONU, the optical amplifier would be necessarily provided for every ONU similarly to the application to the optical transmission terminal station. In order to reduce the degradation in the reception performance due to the noise light component, an optical filter to cut off the noise light component is also applicable together with the optical amplifier. However, in the case where the optical amplifier is provided in the ONU, a set of the optical amplifier and the optical filter would be necessarily provided for every ONU.

As described above, upon considering that the optical amplifier is applied to the PON system, an approach to apply an optical amplifier to the optical transmission terminal station or the optical reception terminal station has room for improvement in the reception performance and the cost. An increase in cost is not preferable for the PON system because it has one of advantageous sales points in the configuration using optical passive components as many as possible.

Therefore, in order to increase the number of optical splitting or to extend the transmission distance in the PON system, it is considered to be useful or effective for applying an optical amplifier to a section between the terminal stations, for example, to the optical fiber transmission line between the OLT and the optical splitter.

In this case, since the transmission lights transmitted by a plurality of ONUs can be collectively amplified by a single optical amplifier, it is not necessary to provide the optical amplifier for every ONU (or subscriber). Further, even when the number of subscribers is further increased, no additional optical amplifiers is required. Examples of the applicable optical amplifier may be a rare-earth-doped optical fiber amplifier such as an erbium-doped optical fiber amplifier (EDFA), a Raman amplifier, and a semiconductor optical amplifier (SOA), or the like.

However, in a case where an optical amplifier is applied to the section between the terminal stations, an arrangement of a pump light source and a power supply system is one of considerations. For example, since the SOA is operable to perform an amplification by receiving a power supply, the power supply system is required. Further, since each of the Raman amplifier and the rare-earth-doped optical fiber amplifier is operable to perform an optical amplification by receiving a pump light from the pump light source such as a semiconductor laser that is operated by receiving a power supply, the power supply system for the pump light source is required.

Therefore, an approach to provide the pump light source and the power supply system in the section between the terminal stations may impair the advantage of the PON system that can be configured by using passive components only. Further, a large-scaled power supply system depending on the transmission distance and the number of subscribers may be required. Furthermore, a maintenance cost for the power supply system may be increased, and the maintenance of the power supply system may be difficult depending on the installation place of the power supply system. As a result, the reliability of the PON system may be decreased.

SUMMARY

An aspect of an optical amplification repeater may include a first rare-earth-doped optical amplification medium, a second rare-earth-doped optical amplification medium, and a pump light split and guide unit. The first rare-earth-doped optical amplification medium amplifies a first signal light to be transmitted to a downstream. The second rare-earth-doped optical amplification medium amplifies a second signal light to be transmitted to an upstream. The pump light split and guide unit is configured to split a pump light transmitted together with any of the first and second signal lights and to guide the split pump light to each of the first and second rare-earth-doped optical amplification mediums.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an example of a relation between an amplification band and a pump light wavelength of the rare-earth-doped optical fiber;

DESCRIPTION OF EMBODIMENTS

Figure 1:
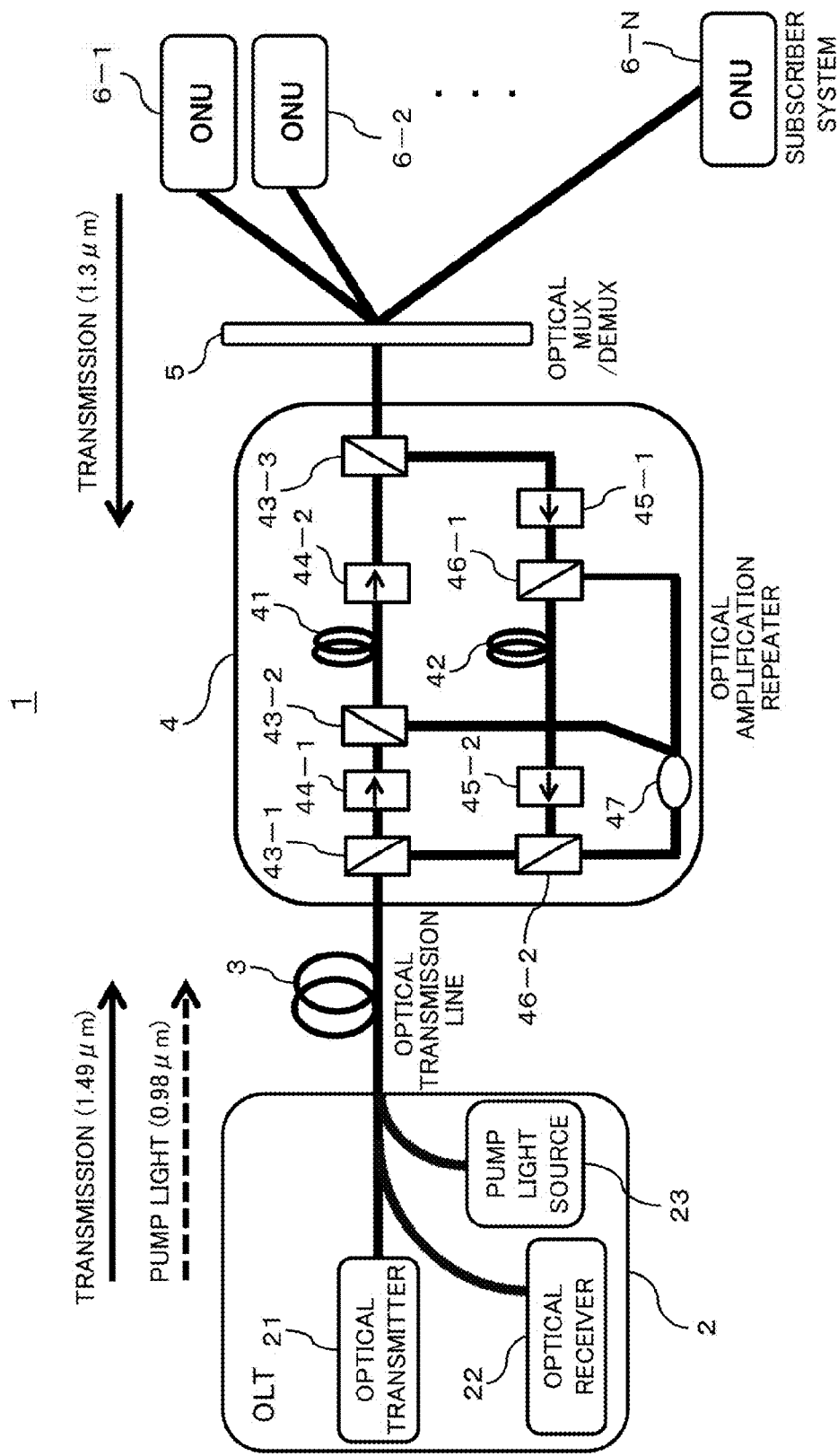
FIG. 1 is a block diagram illustrating an example of a PON system that is an optical communication system according to an embodiment.

Hereinafter, embodiments of the invention will be described with reference to the drawings. However, the embodiments described below are given as merely exemplary, and it is not intended to exclude various modifications and various technical applications that are not explicitly described in the following. In the drawings used in the following embodiments, the portions assigned with the same symbols represent the identical or similar portions unless otherwise mentioned.

FIG. 1 is a block diagram illustrating an example of a PON system that is an optical communication system according to an embodiment. A PON system 1 illustrated in FIG. 1, includes, for example, an OLT 2, an optical amplification repeater 4 connected to the OLT 2 through an optical transmission line 3, an optical multiplexer and demultiplexer (MUX/DMUX) 5, and ONUs 6-1 to 6-N (N is an integer of 2 or more). When it is not necessary to distinguish the ONUs 6-1 to 6-N from each other, the ONUs 6-1 to 6-N may be referred to the "ONU 6".

The OLT 2 transmits a signal light addressed to each of the ONUs 6 to the optical transmission line 3. The signal light transmitted to the optical transmission line 3 is amplified by the optical amplification repeater 4 and is split by the optical MUX/DMUX 5 into a plurality of signal lights according to the ONUs 6. The split signal lights are transmitted to the ONUs 6. A direction from the OLT 2 toward the ONU 6 may be referred to as a "downstream." A wavelength of the downstream signal light, in other words, a transmission wavelength of the OLT 2 may be set to a 1.49-μm band wavelength, for example.

Meanwhile, the respective ONUs 6 transmit signal lights addressed to the OLT 2 to the optical MUX/DMUX 5. The signal lights addressed to the OLT 2 transmitted from the respective ONUs 6 are combined (or multiplexed) by the optical MUX/DMUX 5 and are collectively amplified by the optical amplification repeater 4. The multiplexed and amplified signal light is received by the OLT 2 through the optical transmission line 3. A direction from the ONU 6 toward the OLT 2 may be referred to as an "upstream." The wavelength of the upstream signal light, in other words, a transmission wavelength of each of the ONUs 6 may be set to a 1.3-μm band wavelength, for example.

In order to transmit and receive the signal light to and from the respective ONUs 6, the OLT 2 includes, for example, an optical transmitter 21 and an optical receiver 22. The optical transmitter 21 generates the downstream signal light addressed to the ONU 6 and transmits the signal light to the optical transmission line 3. The optical receiver 22 receives the upstream signal light transmitted by the ONU 6 from the optical transmission line 3.

Further, as illustrated in FIG. 1, the OLT 2 includes a pump light source 23. The pump light source 23 generates a pump light used for an optical amplification in the optical amplification repeater 4. The pump light is transmitted together with the downstream signal light to the optical transmission line 3, for example. In other words, the optical amplification in the optical amplification repeater 4 is collectively and remotely performed by the pump light source 23 in the OLT 2. Therefore, a pump light source is unnecessary for the optical amplification repeater 4, and therefore, a power supply system for the pump light source is also unnecessary. The pump light source 23 may be referred to as the "remote pump light source 23", and the pump light output by the pump light source 23 may be referred to as a "remote pump light".

Figure 2:
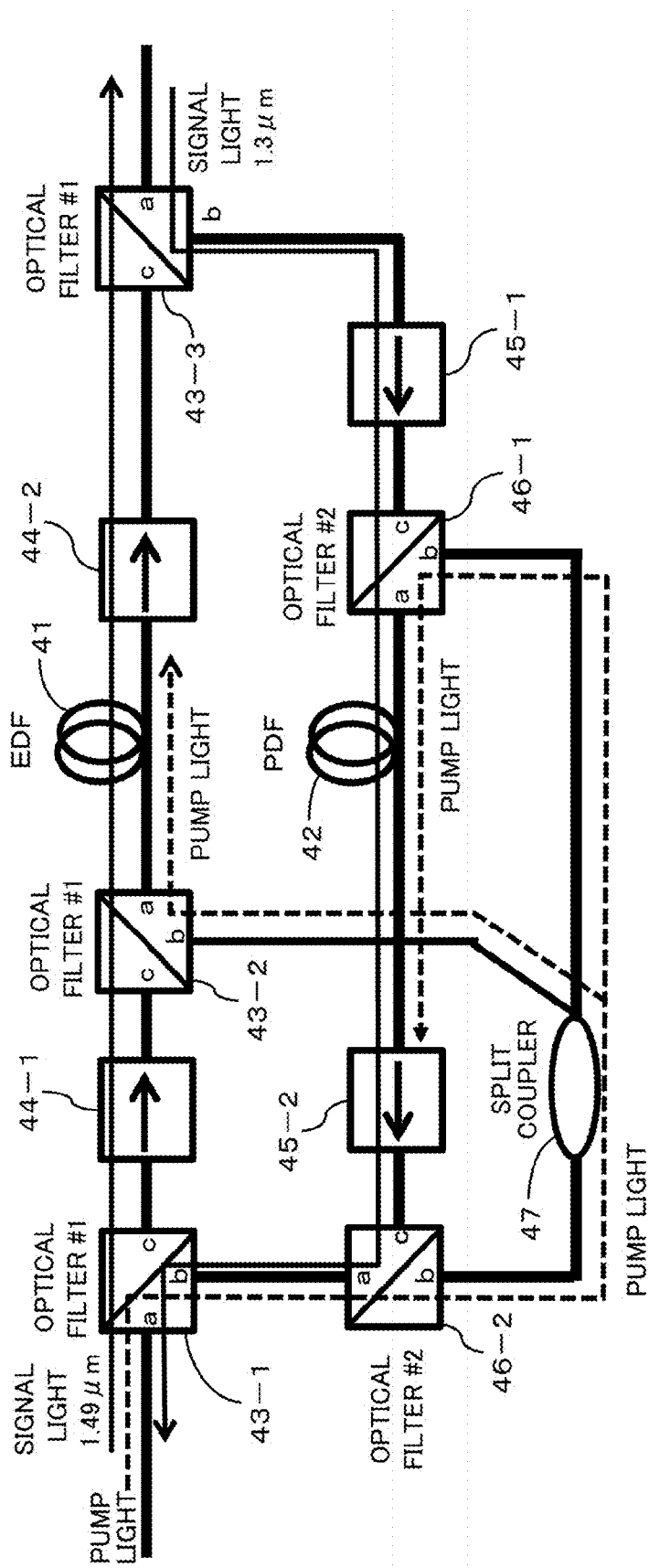
FIG. 2 is a block diagram illustrating an exemplary configuration of an optical amplification repeater illustrated in FIG. 1.

FIGS. 1 and 2 illustrate an exemplary configuration of the optical amplification repeater 4 of the embodiment. The "repeater" may be referred to as the "relay." As illustrated in FIGS. 1 and 2, the optical amplification repeater 4 includes, for example, a first optical amplification medium 41 and a second optical amplification medium 42. The first optical amplification medium 41 amplifies the downstream signal light that is an example of a first signal light. The second optical amplification medium 42 amplifies the upstream signal light that is an example of a second signal light. The optical amplification mediums 41 and 42 may be referred to as the "optical amplifiers 41 and 42", respectively.

Rare-earth doped optical fibers are applicable to these optical amplification mediums 41 and 42. Examples of a rare earth element doped in the optical fiber may include erbium (Er), praseodymium (Pr), thulium (Tm), neodymium (Nd), ytteribium (Yb), holmium (Ho), or the like.

Figure 3:
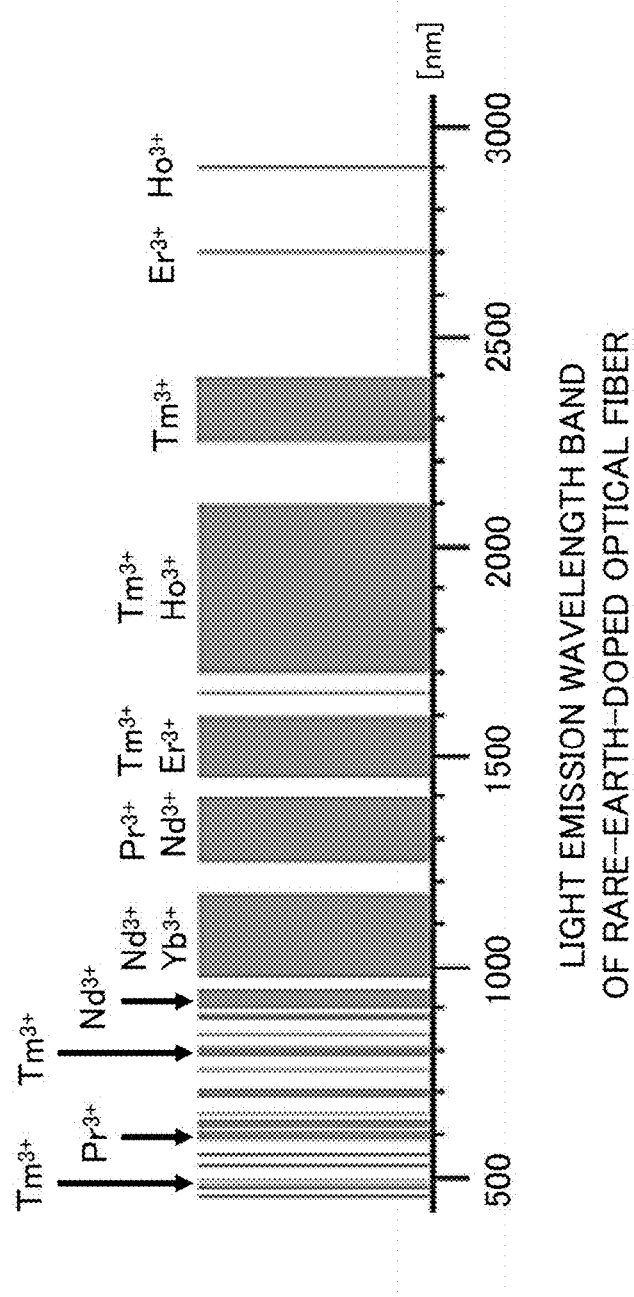
FIGS. 3 and 4 are diagrams illustrating an example of a light emission wavelength band (amplification band) of a rare-earth-doped optical fiber.
Figure 4:
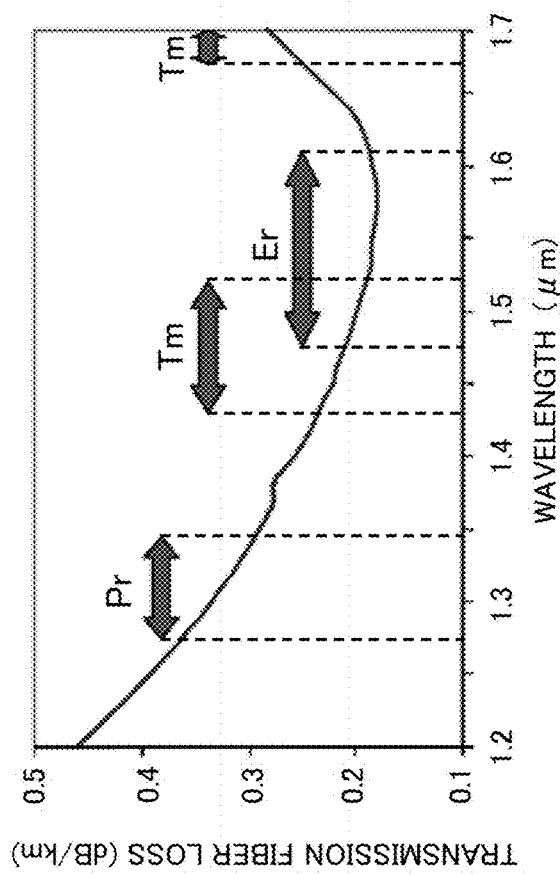

As illustrated in FIGS. 3 and 4, a light emission wavelength band (in other words, an amplification band) of a rare-earth-doped optical fiber may be determined depending on the type of a rare earth element doped in the optical fiber. Therefore, a rare earth element doped in an optical fiber amplifier may be selected depending on an amplification target of a signal light wavelength.

For example, in a case where the downstream signal light is light with a 1.49-μm band wavelength as described above, the erbium-doped optical fiber (EDF) doped with erbium (Er) is applicable to the first optical amplification medium 41. Meanwhile, in a case where the upstream signal light is light with a 1.3-μm band wavelength as described above, a praseodymium-doped optical fiber (PDF) doped with praseodymium (Pr) is applicable to the second optical amplification medium 42, for example.

A pump light wavelength of the rare-earth-doped optical fiber may be determined depending on the type of rare earth element to be doped in the optical fiber as illustrated in FIG. 5, for example. FIG. 5 illustrates an example of the pump light wavelengths of praseodymium (Pr) and neodymium (Nd) that are available to amplify a 1.3-μm band, and thulium (Tm) and erbium (Er) that are available to amplify a 1.49-μm band, for example.

As can be seen from FIG. 5, the pump light wavelength of a 0.98-μm band is commonly available for both of the EDF 41 and the PDF 42. Therefore, by setting a wavelength of the pump light used for a remote pump by the pump light source 23 of the OLT 2 to a 0.98-μm band wavelength, both of the EDF 41 and the PDF 42 can be pumped by the single pump light source 23. In other words, both of the optical amplification mediums 41 and 42 for the downstream and the upstream can be remotely pumped by the single pump light source 23 of the OLT 2.

Therefore, as illustrated in FIG. 2, the optical amplification repeater 4 of the embodiment is provided with internal optical transmission routes to split the pump light received from the OLT 2 (the optical transmission line 3) and to guide the split pump lights together with the signal light to the EDF 41 and the PDF 42. The internal optical transmission routes may be provided by using optical filters 43-1, 43-2, and 43-3, optical filters 46-1 and 46-2, and a split coupler 47, as a non-limiting example. Since these optical components are exemplary components of a pump light split and guide unit and all of the components are passive components, there is no need to provide a power supply.

The rare-earth-doped optical fiber is operable to perform a stable amplification in a case where the following conditional Equation (1) is satisfied.

$$G(R1*R2)^{1/2} \geq 0 \qquad (1)$$

In the Equation (1), G represents an amplification gain, and R1 and R2 represent optical reflection rates at the input and output sides.

In order to satisfy the stable amplification condition, isolators 44-1 and 44-2 may be provided at the input and output sides of the EDF 41. Similarly, isolators 45-1 and 45-2 may be provided at the input and output sides of the PDF 42. The isolators 44-1, 44-2, 45-1 and 45-2 output an input signal light in one direction and prevent an output signal light from being transmitted in a reverse direction. Any of the isolators 44-1, 44-2, 45-1 and 45-2 may be alternatively a circulator.

Figure 6:
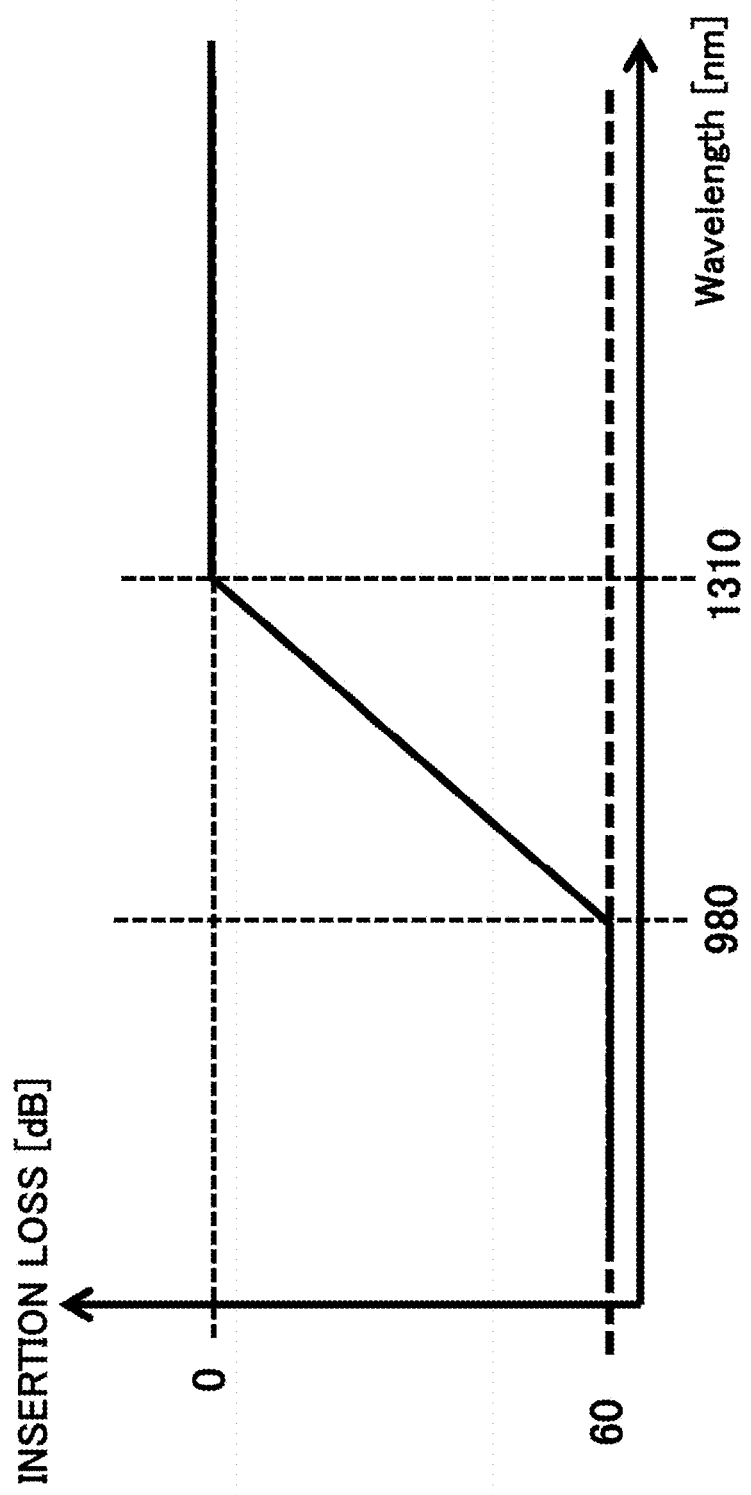
FIG. 6 is a diagram illustrating an example of an insertion loss characteristic with respect to a wavelength of an isolator (or a circulator)

A Faraday rotator using yttrium iron garnet (YIG) is applicable to the isolator and the circulator. However, as illustrated in FIG. 6, the Faraday rotator using the YIG has characteristics of absorbing light at a short wavelength side.

Therefore, even when the downstream signal light of the 1.49-μm band and the upstream signal light of the 1.3-μm band are allowed to pass through the isolator and the circulator with low loss but the pump light of the 0.98-μm band is not allowed to pass through the isolator and the circulator with low loss. In other words, each of the isolator and the circulator is an example of an insertion loss component for the pump light.

Therefore, the optical amplification repeater 4 illustrated in FIG. 2 is provided with internal optical transmission routes that bypasses the isolators 44-1, 44-2, 45-1 and 45-2 to guide the pump light to each of the EDF 41 and the PDF 42.

For example, the optical filters 43-1 to 43-3 may be provided at the front stage of the isolator 44-1, between the isolator 44-1 and the EDF 41, and at the rear stage of the isolator 44-2, respectively. Further, the optical filters 46-1 and 46-2 may be provided between the isolator 45-1 and the PDF 42, and at the rear stage of the isolator 45-2, respectively. When it is not necessary to distinguish the optical filters 43-1 to 43-3 from each other, each of the optical filters 43-1 to 43-3 may be simply referred to as an "optical filter 43". Similarly, when it is not necessary to distinguish the optical filters 46-1 and 46-2 from each other, each of the optical filters 46-1 and 46-2 may be simply referred to as an "optical filter 46".

Figures 7A, 7B:
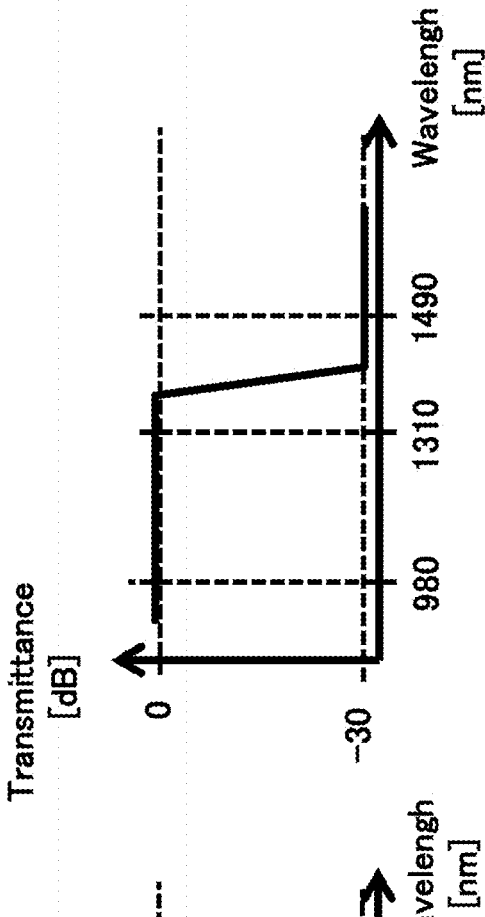
FIGS. 7A and 7B are diagrams illustrating an example of a transmittance characteristic (or reflection characteristic) with respect to a wavelength of an optical filter #1 illustrated in FIG. 2.

As illustrated in FIG. 2, each optical filter 43 has three ports a, b and c. For example, FIG. 7A illustrates an exemplary transmittance characteristic (or reflection characteristic)

between the ports a and c. FIG. 7B illustrates an exemplary reflection characteristic (or transmittance characteristic) between the ports a and b.

For example, when the light with the 1.49-μm band wavelength is input to the port a (or c) of the optical filter 43, the optical filter 43 transmits (or outputs) the input light to the port c (or a). Further, when the light with the 1.3-μm band wavelength and the light with 0.98-μm band wavelength are input to the port a (or b) of the optical filter 43, the optical filter 43 reflects the input light to output from the port b (or a).

Figure 8A:
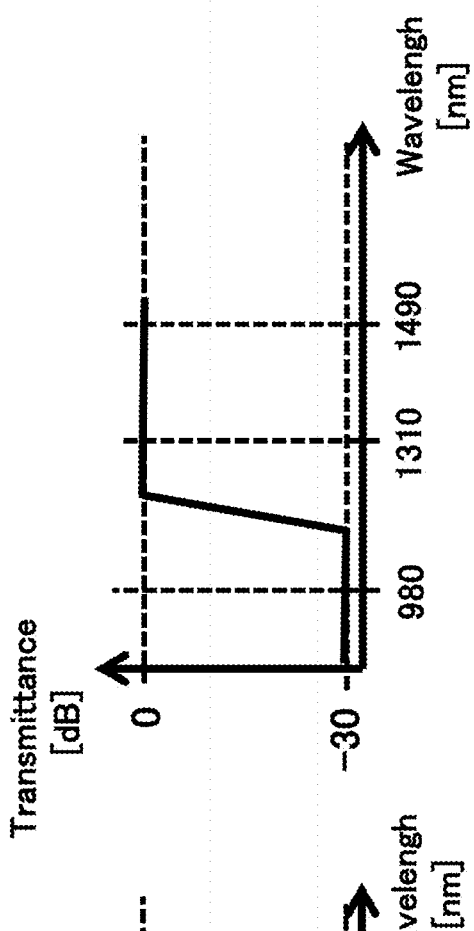
FIGS. 8A and 8B are diagrams illustrating an example of a transmittance characteristic (or reflection characteristic) with respect to a wavelength of an optical filter #2 illustrated in FIG. 2.
Figure 8B:
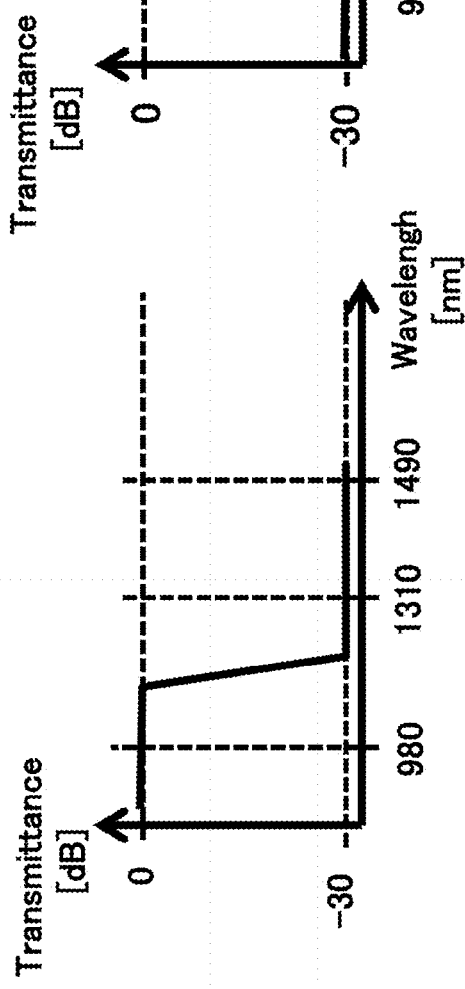

Meanwhile, as illustrated in FIG. 2, each optical filter 46 has also three ports a, b and c. For example, FIG. 8A illustrates an exemplary transmittance characteristic (or reflection characteristic) between the ports a and b. FIG. 8B illustrates an exemplary reflection characteristic (or transmittance characteristic) between the ports a and c.

For example, when the light with the 0.98-μm band wavelength is input to the port a (or b) of the optical filter 46, the optical filter 46 transmits (or outputs) the input light to the port b (or a). Further, when the light with the 1.3-μm band wavelength and the light with 1.49-μm band wavelength are input to the port c (or a) of the optical filter 46, the optical filter 46 transmits (or outputs) the input light to the port a (or c).

Therefore, by arranging the optical filters 43 and 46 and the split coupler 47 as illustrated in FIG. 2, the signal light (with the 1.49-μm band) in the downstream can be guided together with the pump light (with the 0.98-μm band) to the EDF 41. Further, the signal light (with the 1.3-μm band) in the upstream can be guided together with the pump light (with the 0.98-μm band) to the PDF 42.

For example, with focusing on the downstream, among the signal light (the 1.49-μm band) and the pump light (the 0.98-μm band) input from the optical transmission line 3, the signal light is output from the port c of the optical filter 43-1 and input to the port c of the optical filter 43-2 through the isolator 44-1. The signal light input to the port c of the optical filter 43-2 is output from the port a of the optical filter 43-2 and input to the EDF 41.

Meanwhile, the pump light is output from the port b of the optical filter 43-1 and input to the port a of the optical filter 46-2. Therefore, the optical filter 43-1 may be considered as an example of a (first) demultiplexer that wavelength-demultiplexes the downstream signal light and the pump light.

The pump light input to the port a of the optical filter 46-2 is output from the port b of the optical filter 46-2 and input to the split coupler 47. The split coupler 47 splits the input pump light into two pump lights and inputs one of the split pump lights to the port b of the optical filter 43-2 provided between the isolator 44-1 and the EDF 41.

The pump light input to the port b of the optical filter 43-2 is input to the EDF 41 from the port a of the optical filter 43-2 together with the signal light input to the port c of the optical filter 43-2. Therefore, the optical filter 43-2 may be considered as an example of a (first) multiplexer that wavelength-multiplexes the downstream signal light and one of the split pump lights split by the split coupler 47 to input the wavelength-multiplexed pump light to the EDF 41.

As described above, the EDF 41 amplifies the signal light passed through the optical filter 43-1, the isolator 44-1 and the optical filter 43-2 by using the one of the split pump lights that bypass the isolator 44-1 and that is split by the split coupler 47.

The downstream signal light amplified by the EDF 41 is input to the port c of the optical filter 43-3 through the isolator 44-2. The signal light input to the port c of the optical filter 43-3 is output from the port a of the optical filter 43-3 and transmitted toward the ONU 6 (to the optical MUX/DMUX 5).

Meanwhile, with focusing on the upstream, the signal light (with the 1.3-μm band) input from the optical MUX/DMUX 5 is input to the port a of the optical filter 43-3 and is output from the port b of the optical filter 43-3. The signal light output from the port b of the optical filter 43-3 is input to the port c of the optical filter 46-1 through the isolator 45-1.

The signal light input to the port c of the optical filter 46-1 is output from the port a of the optical filter 46-1 and is input to the PDF 42. Meanwhile, the other pump light split by the split coupler 47 is input to the port b of the optical filter 46-1. The pump light input to the port b of the optical filter 46-1 is input to the PDF 42 from the port a of the optical filter 46-1.

As described above, the PDF 42 amplifies the signal light passed through the optical filter 43-3, the isolator 45-1 and the optical filter 46-1 by using the other pump light that bypasses the isolators 44-1 and 45-1 and that is split by the split coupler 47.

The upstream signal light amplified by the PDF 42 is input to the port c of the optical filter 46-2 through the isolator 45-2. The signal light input to the port c of the optical filter 46-2 is input to the port b of the optical filter 43-1 from the port a of the optical filter 46-2. The signal light input to the port b of the optical filter 43-1 is transmitted toward the OLT 2 (to the optical transmission line 3) from the port a of the optical filter 43-1.

As described above, in the above-mentioned embodiment, the pump light source 23 common to the respective optical amplification mediums 41 and 42 of the downstream and the upstream is provided in the OLT 2 to remotely pump the respective optical amplification mediums 41 and 42. Therefore, since an active component such as the pump light source is not necessary for the optical amplification repeater 4, the optical amplification repeater 4 can be configured only by passive components, so that the power supply system is not necessary for the repeater 4.

Since the power supply system is not necessary, a space saving and an easy and simple maintenance can be achieved at a repeating (or relay) point provided with the optical amplification repeater 4. Further, there is no need to install cables to supply power from the OLT 2 to the repeating point.

Furthermore, since the active components are not necessary for the repeater 4, it is possible to significantly reduce a failure rate of the repeater 4 to thereby reduce a failure rate of the PON system 1. In other words, it is possible to improve a stable operation (or reliability) of the repeater 4 to thereby improve a stable operation (or reliability) of the PON system 1. Therefore, the optical amplification repeater 4 is allowed to be installed in not only a managed circumstance such as an inside of a building but also an unmanaged circumstance in which the repeater 4 is easily affected by any one or more of temperature, humidity, vibration, impact and stress, or the like. Therefore, it is possible to improve the flexibility in installation place of the repeater 4.

Further, since the pump light source 23 is commonly used for (or shared by) the respective optical amplification mediums 41 and 42 of the downstream and the upstream, there is no need to provide dedicated pump light sources for the downstream and upstream signal lights. Therefore, it is possible to downsize the OLT 2.

The above-mentioned example employs a forward pump configuration in which the respective pump lights split by the split coupler 47 are guided from the input sides (the optical filters 43-2 and 46-1) of the EDF 41 and the PDF 42 but a backward pump configuration may be employed. For example, one or both of the EDF 41 and the PDF 42 may employ the backward pump configuration.

(First Modification)

Figure 9:
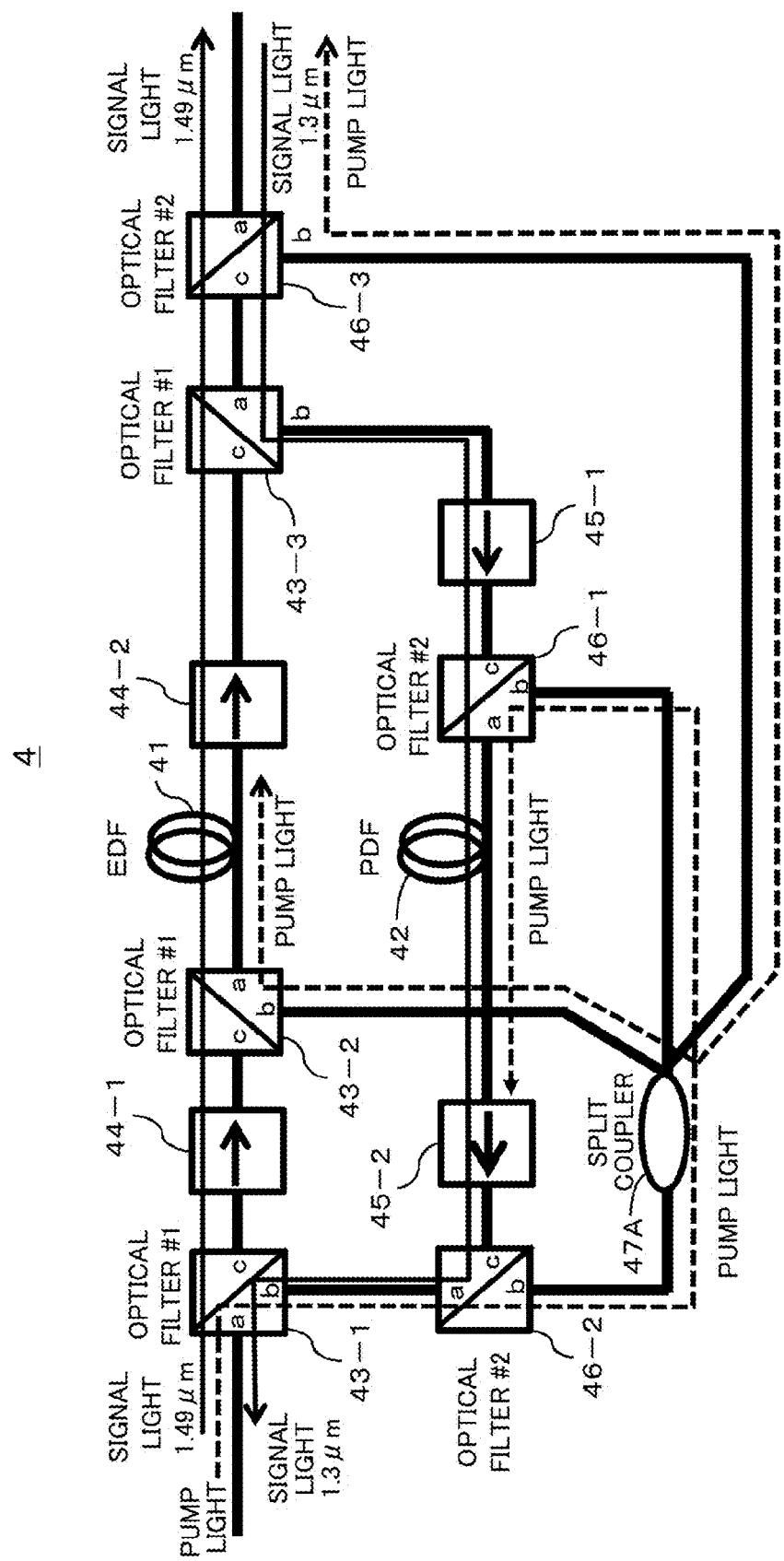
FIG. 9 is a block diagram illustrating a first modification of the optical amplification repeater illustrated in FIG. 2.

FIG. 9 is a block diagram illustrating a first modification of the above-mentioned optical amplification repeater 4. The optical amplification repeater 4 illustrated in FIG. 9 is different from the configuration illustrated in FIG. 2 in that the optical filter 46-3 is additionally provided and that a split coupler 47A is provided instead of the split coupler 47.

The optical filter 46-3 has the transmittance characteristic (or reflection characteristic) similarly to the above-mentioned optical filters 46-1 and 46-2. For example, the port c of the optical filter 46-3 is optically connected to the port a of the optical filter 44-2, and the port b to one of three output terminals of the split coupler 47A. The port a of the optical filter 46-3 is optically connected to the optical transmission line 3 leading to the optical MUX/DMUX 5.

The split coupler 47A splits the pump light input from the optical filter 46-2 into three pump lights. Two of the three split pump lights are guided to the optical amplification mediums 41 and 42 through the optical filters 43-2 and 46-1 as described in the above-mentioned embodiment. The remaining one of the three split pump lights is input to the port b of the optical filter 46-3 and is transmitted from the port a of the optical filter 46-3 to the downstream.

Figure 10:
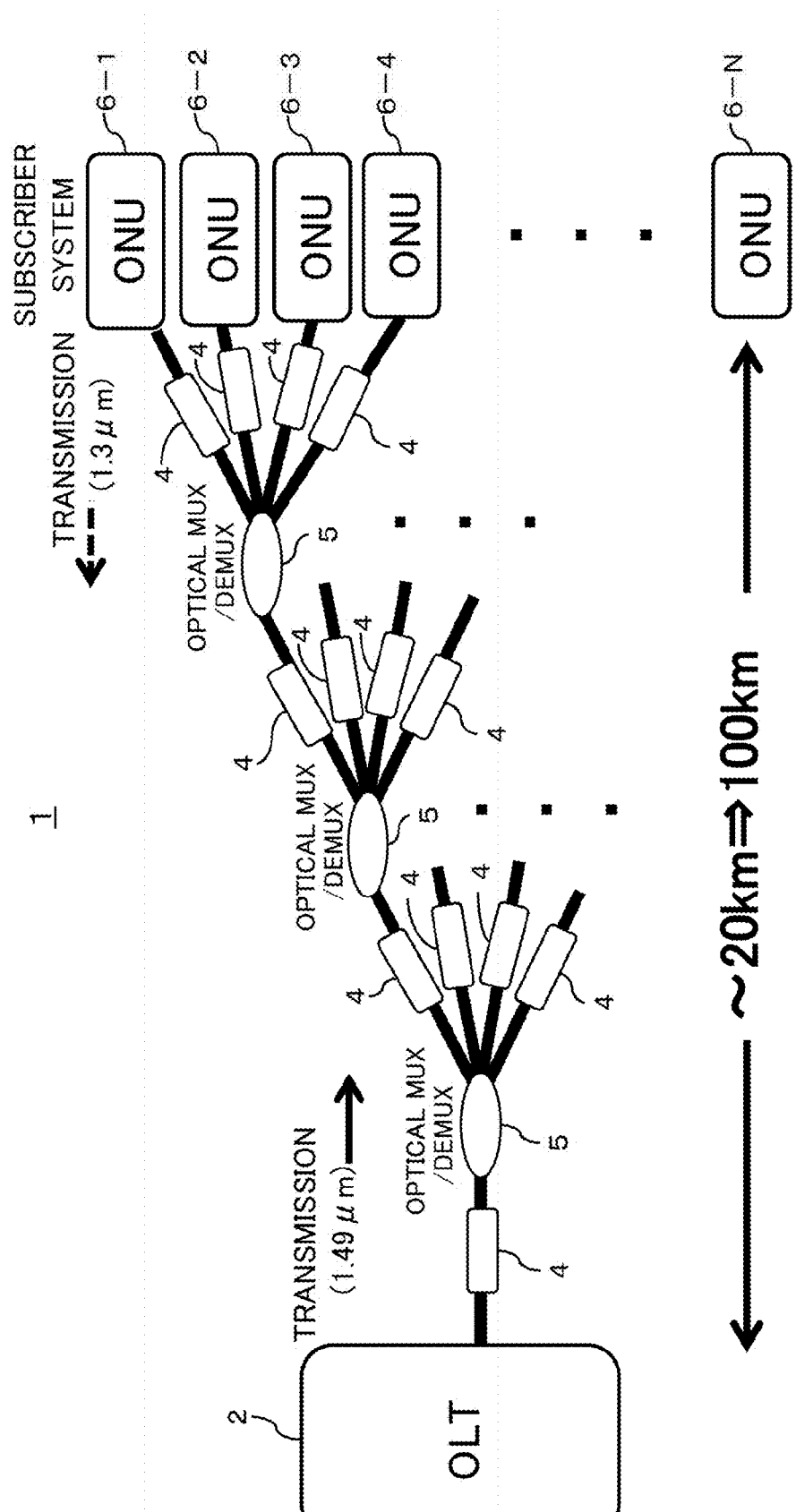
FIG. 10 is a diagram for illustrating an exemplary application of the optical amplification repeater illustrated in FIG. 9 to the PON system.

Therefore, for example, as illustrated in FIG. 10, an additional optical amplification repeater 4 may be provided in any of split paths (or lines) split at the downstream side of the optical MUX/DMUX 5, and an additional optical MUX/DMUX 5 may be provided at the downstream side of the additional optical amplification repeater 4. In this way, the set of the repeater 4 and the optical MUX/DMUX 5 may be appropriately and repeatedly provided to configure the PON system 1.

As described above, even though the optical MUX/DMUX 5 and the repeater 4 are connected in a daisy chain, the pump light transmitted from the pump light source 23 in the OLT 2 is serially relayed to another optical amplification repeater 4 at the downstream side through the port a of the optical filter 46-3 of each optical amplification repeater 4.

Therefore, it is possible to correctively and remotely pump the respective optical amplification mediums 41 and 42 of each optical amplification repeater 4 by the single pump light source 23 from the OLT 2. Accordingly, while avoiding an arrangement of any power supply systems for each optical amplification repeater 4, it is possible to flexibly and easily support a change (for example, extension) in the transmission distance of the PON system 1 and a change (for example, increase) in the number (the optical splitting number) of subscribers (the ONU 6). In other words, since the number of the optical MUX/DMUXs 5 and the repeaters 4 to be installed may be increased or decreased depending on the transmission distance and/or the number of subscribers required for the PON system 1, it is possible to satisfy the requirement.

The optical splitting number (N) of the split coupler 47A may be "4" or more. Two of the split pump lights split by the 1×N split coupler 47A may be guided to the optical amplification mediums 41 and 42 and the remaining split pump lights may be transmitted to the downstream together with the downstream signal light.

(Second Modification)

Figure 11:
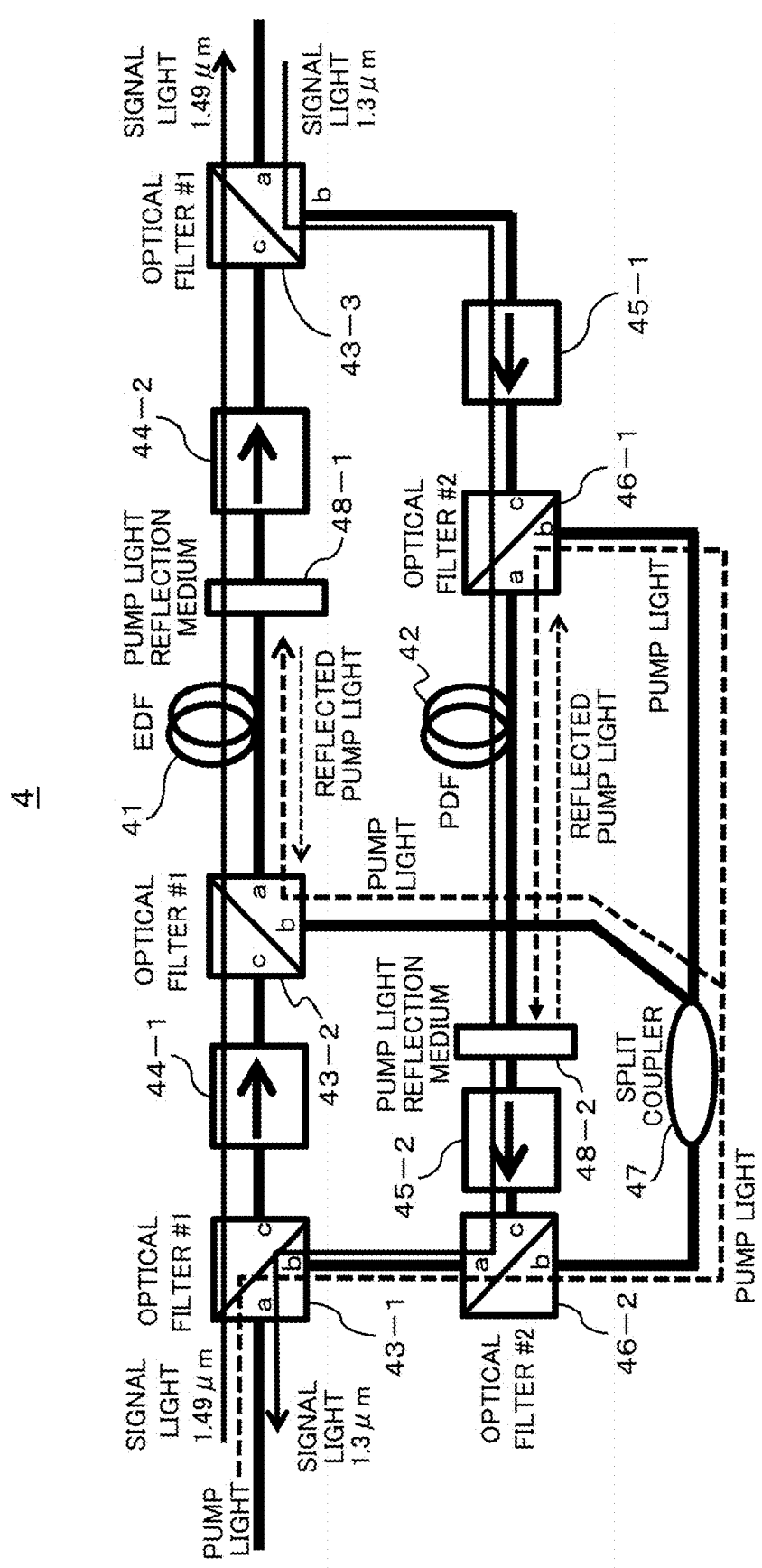
FIG. 11 is a block diagram illustrating a second modification of the optical amplification repeater illustrated in FIG. 2.

FIG. 11 is a block diagram illustrating a second modification of the optical amplification repeater 4 illustrated in FIG. 2. The optical amplification repeater 4 illustrated in FIG. 11 is different from the configuration illustrated in FIG. 2 in that a pump light reflection medium 48-1 is provided between the EDF 41 and the isolator 44-2 and that a pump light reflection medium 48-2 is provided between the PDF 42 and the isolator 45-2. The pump light reflection mediums 48-1 and 48-2 may be considered as an exemplary components of the pump light split and guide unit described above.

Each of the pump light reflection mediums 48-1 and 48-2 reflects the pump light of the wavelength (in the 0.98-μm band) in the reverse direction and transmits the signal light of the wavelength (in the 1.3-μm band and the 1.49-μm band). Therefore, the pump light reflection medium 48-1 passes the downstream signal light (with the 1.49-μm band) amplified by the EDF 41 to the isolator 44-2 and reflects a residual pump light output from the EDF 41 to re-input the residual pump light into the EDF 41.

Similarly, the pump light reflection medium 48-2 passes the upstream signal light (with the 1.3-μm band) amplified by the PDF 42 to the isolator 45-2 and reflects a residual pump light output from the PDF 42 to re-input the residual pump light into the PDF 42.

In this way, by reflecting the residual pump lights with the pump light reflection mediums 48-1 and 48-2 to re-input the residual pump lights into the EDF 41 and the PDF 42, the residual pump lights can be reused in amplifying the signal light. In other words, the EDF 41 and the PDF 42 are bidirectionally pumped by the pump lights input as forward pump lights from the optical filters 43-2 and 46-1 and pumped by the pump lights as backward pump lights reflected on the pump light reflection mediums 48-1 and 48-2, respectively.

Therefore, it is possible to achieve an effective or efficient use of the pump light output by the single pump light source 23 in the OLT 2, and the output power of the pump light required for the pump light source 23 can be reduced in comparison with a case where the pump light reflection mediums 48-1 and 48-2 are not provided. Accordingly, it is possible to reduce the cost of the pump light source 23 to thereby reduce the cost of the OLT 2.

In the above-mentioned example, the pump light reflection mediums 48-1 and 48-2 are provided for the EDF 41 for the downstream and the PDF 42 for the upstream, respectively, but only one of the reflection mediums 48-1 and 48-2 may be provided for any one of the EDF 41 and PDF 42.

(Third Modification)

In the embodiment and the modifications described above, the pump light source 23 is provided in the OLT 2 but the pump light source may be provided in the ONU 6. In other words, the pump light used in each of the optical amplification mediums 41 and 42 in the optical amplification repeater 4 may be input to the repeater 4 from the upstream side. For example, in the configuration illustrated in FIG. 1, the pump light source that introduces the pump light to the upstream may be provided in the optical transmission line that connects the optical MUX/DMUX 5 and any of the ONUs 6.

The optical amplification repeater 4 may be configured such that the pump light input from any one of the ONUs 6 is split and the split pump lights are guided to the optical amplification mediums 41 and 42 via a route (may be referred to as a "bypass route") not passing through the isolator (or the circulator).

Figure 12:
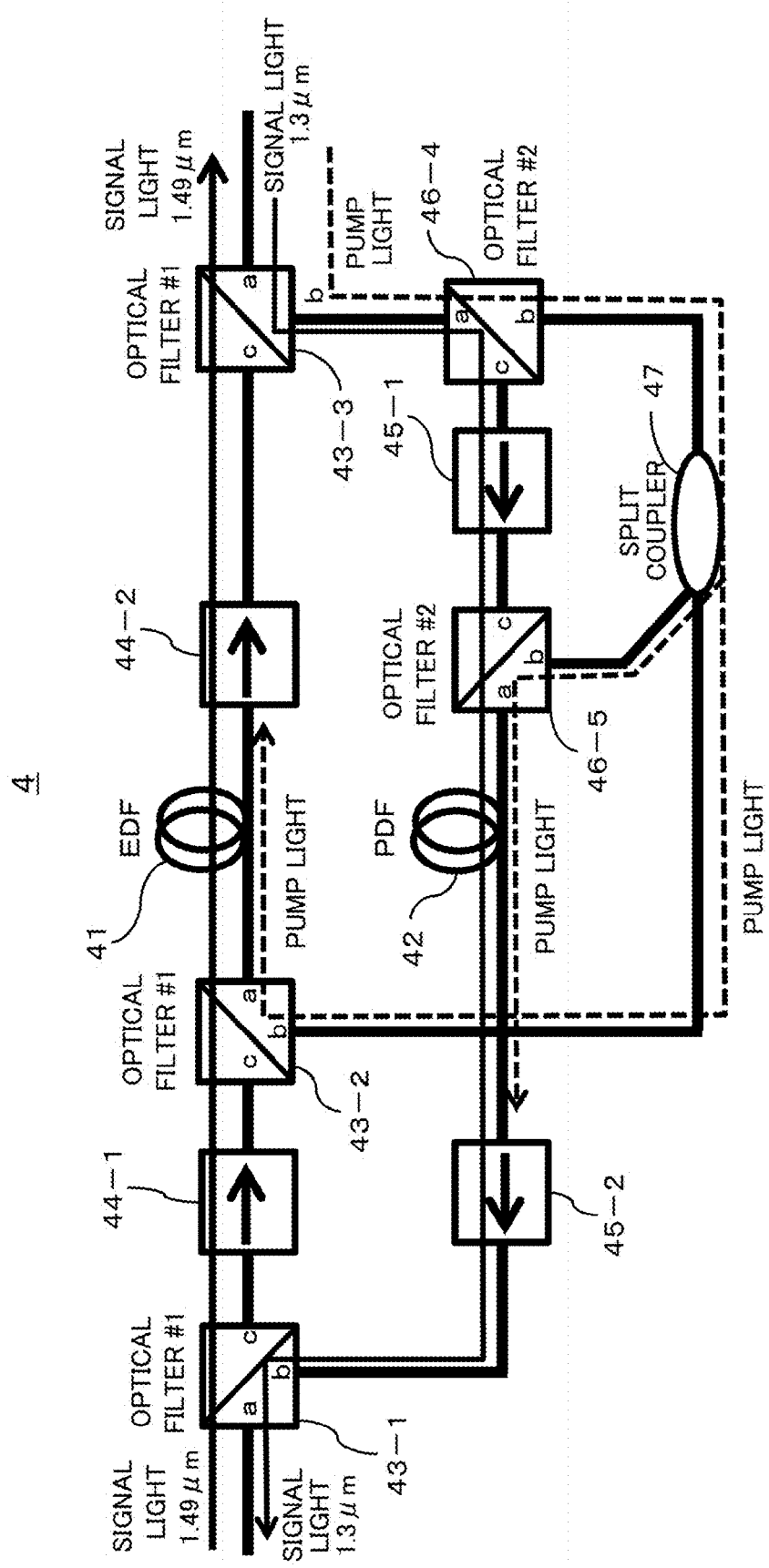
FIG. 12 is a block diagram illustrating a third modification of the optical amplification repeater illustrated in FIG. 2.

FIG. 12 illustrates a third modification of the optical amplification repeater with the above-described configuration. The optical amplification repeater 4 illustrated in FIG. 12 is different from the configuration illustrated in FIG. 2 in that the optical filters 46-4 and 46-5 are provided instead of the optical filters 46-1 and 46-2.

The optical filters 46-4 and 46-5 have the transmittance characteristic (or reflection characteristic) illustrated in FIGS. 8A and 8B similarly to the optical filters 46-1 and 46-2, respectively. For example, the optical filter 46-4 is input the light (the pump light) with the 0.98-μm band wavelength to the port a and outputs the pump light to the port b. Further, the optical filter 46-4 is input the light (the upstream signal light) with the 1.3-μm band wavelength to the port a and outputs the signal light to the port c.

Meanwhile, the optical filter 46-5 is input the light (the upstream signal light) with the 1.3-μm band wavelength to the port c and outputs the signal light to the port a. Further, the optical filter 46-5 is input the light (the pump light) with the 0.98-μm band wavelength to the port b and outputs the pump light to the port a.

The port a of the optical filter 46-4 is optically connected to the port b of the optical filter 43-3. The port b of the optical filter 46-4 is optically connected to the input port of the split coupler 47. The port c of the optical filter 46-4 is optically connected to the input port of the isolator 45-1.

Meanwhile, the port c of the optical filter 46-5 is optically connected to the output port of the isolator 45-1. The port b of the optical filter 46-5 is optically connected to one of two output ports of the split coupler 47. The port a of the optical filter 46-5 is optically connected to the input port of the PDF 42. The other output port of the split coupler 47 is optically connected to the port b of the optical filter 43-2.

Therefore, similarly to the case of FIG. 2, when the pump light with the 0.98-μm band wavelength and the signal light with the 1.3-μm band wavelength are input to the port a of the optical filter 43-3, the pump light and the signal light are input to the port a of the optical filter 46-4 from the port b of the optical filter 43-3.

In the input light from the optical filter 43-3, the optical filter 46-4 outputs the signal light to the isolator 45-1 from the port c and outputs the pump light to the split coupler 47 from the port b. In other words, the optical filter 46-4 may be considered as an example of a (second) demultiplexer that wavelength-demultiplexes the upstream signal light and the pump light input from the ONU 6 side.

The split coupler 47 splits the pump light input from the port b of the optical filter 46-4 into two pump lights. Similarly to the case of FIG. 2, one of the split pump lights is input to the port b of the optical filter 43-2, and the other split pump light is input to the port b of the optical filter 46-5.

The pump light input from the split coupler 47 to the port b of the optical filter 43-2 is output from the port a of the optical filter 43-2. The downstream signal light (with the 1.49-μm band wavelength) passing through the optical filter 43-1 and the isolator 44-1 is output from the port a of the optical filter 43-2 together with the pump light.

Therefore, one of the pump lights split by the split coupler 47 and the downstream signal light (with the 1.49-μm band wavelength) are input to the EDF 41 from the port a of the optical filter 43-2. In other words, the optical filter 43-2 may be considered as an example of a (third) multiplexer that wavelength-multiplexes one of the pump lights split by the split coupler 47 and the downstream signal light to input the multiplexed signal to the EDF 41.

Meanwhile, the pump light input to the port b of the optical filter 46-5 from the split coupler 47 is output from the port a of the optical filter 46-5. The upstream signal light (with the 1.3-μm band wavelength) passing through the optical filters 43-3 and 46-4 and the isolator 45-1 is output from the port a of the optical filter 46-5 together with the pump light.

Therefore, the other of the pump lights split by the split coupler 47 and the upstream signal light (with the 1.3-μm band wavelength) are input to the PDF 42 from the port a of the optical filter 46-5. In other words, the optical filter 46-5 may be considered as an example of a (fourth) multiplexer that wavelength-multiplexes one of the pump lights split by the split coupler 47 and the upstream signal light to input the multiplexed signal to the PDF 42.

As described above, even in a case where the pump light is input to the optical amplification repeater 4 from the ONU 6 side, it is possible to guide the respective split pump lights obtained by splitting the pump light to the EDF 41 and the PDF 42 via the bypass route not passing through the isolators 44-1 and 45-1. Therefore, the pump light source 23 of the OLT 2 can be deleted and therefore, it is possible to achieve a simple configuration of the OLT and/or to reduce the cost of the OLT 2.

The pump light reflection mediums 48-1 and 48-2 illustrated in the second modification (depicted in FIG. 11) may be applied to the configuration of the third modification illustrated in FIG. 12. For example, the pump light reflection medium 48-1 may be provided between the EDF 41 and the isolator 44-2, and the pump light reflection medium 48-2 may be provided between the PDF 42 and the isolator 45-2. Thereby, similarly to the second modification, it is possible to reuse the pump light to amplify the signal light.

(Fourth Modification)

In the example described above, the pump light is input to the optical amplification repeater 4 from any one of the OLT 2 and the ONU(s) 6 but the pump light may be input to the repeater 4 from both of the OLT 2 and the ONU(s) 6.

In this case, the optical amplification repeater 4 can be configured to pump (for example, bidirectionally pump) the optical amplification mediums 41 and 42 by using the pump lights obtained by splitting the pump lights input from both of the OLT 2 and the ONU(s) 6.

Figure 13:
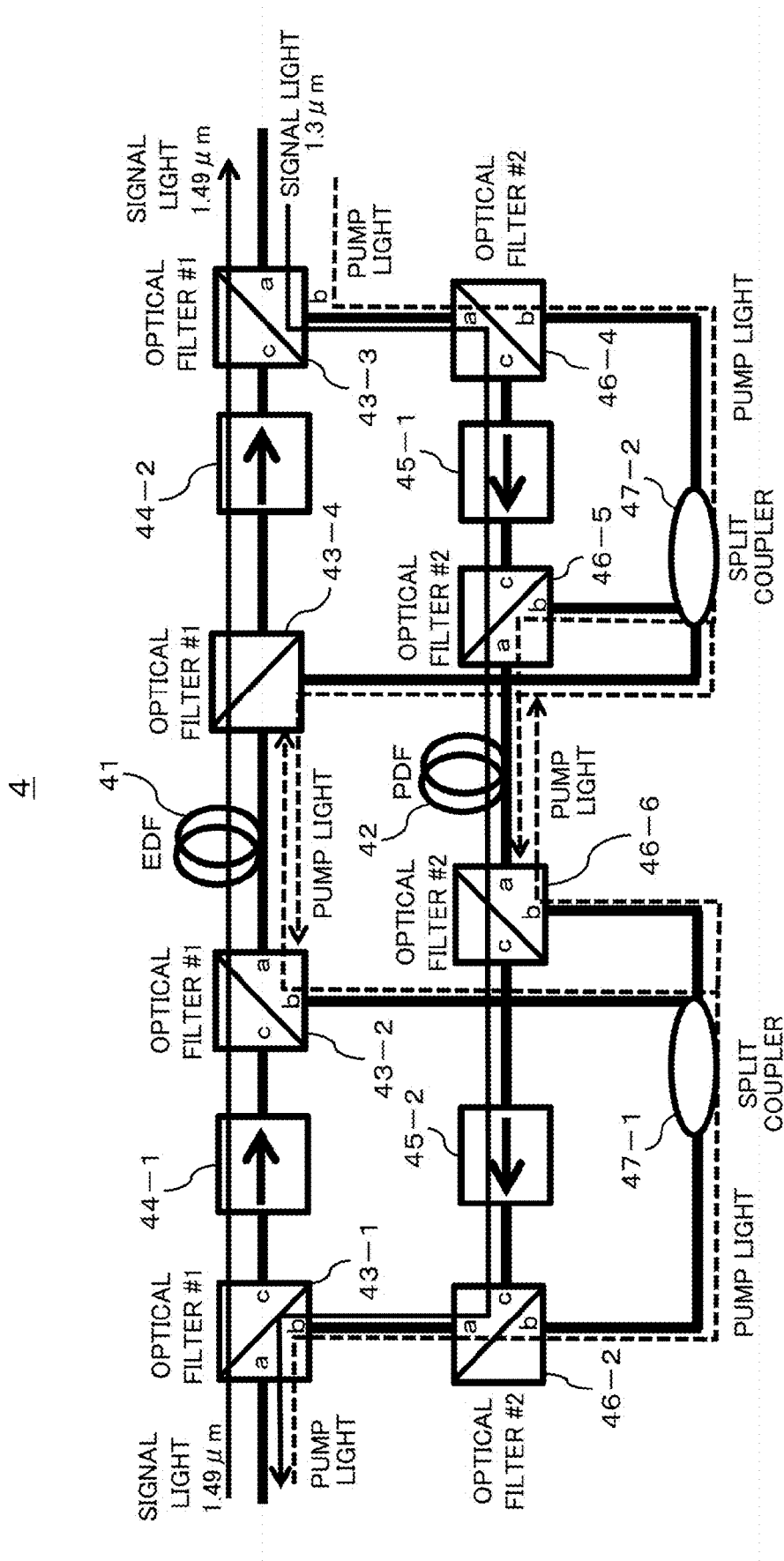
FIG. 13 is a block diagram illustrating a fourth modification of the optical amplification repeater illustrated in FIG. 2.

FIG. 13 illustrates an exemplary configuration (a fourth modification) of the optical amplification repeater 4 in such a case. The configuration of the optical amplification repeater 4 illustrated in FIG. 13 is different from the configuration illustrated in FIG. 2 in that two split couplers 47-1 and 47-2 are provided instead of the split coupler 47 and that optical filters 46-4 and 46-5 illustrated in the third modification (see FIG. 12) and an additional optical filter 46-6 are provided.

Similarly to the optical filters 46-1 to 46-5 described above, the optical filter 46-6 has the transmittance characteristic (or reflection characteristic) illustrated in FIGS. 8A and 8B. For example, in the optical filter 46-6, when the light with the 1.3-μm band wavelength is input to the port a, the light is output to the port c, and when the light with the 0.98-μm band wavelength is input to the port b, the light is output to the port a.

Herein, the optical filter 46-6 is provided between the PDF 42 and the isolator 45-2, the port a is optically connected to the PDF 42, and the port c is optically connected to the input port of the isolator 45-2, for example. The port b of the optical filter 46-6 is optically connected to one of two output ports of the split coupler 47-1.

Each of the split couplers 47-1 and 47-2 splits the input light into two pump lights. The split coupler 47-1 is used to split the pump light which is input to the optical amplification repeater 4 from the OLT 2 side. The split coupler 47-2 is used to split the pump light which is input to the optical amplification repeater 4 from the ONU 6 side.

Therefore, the input port of the split coupler 47-1 is optically connected to the port b of the optical filter 46-2, and the input port of the split coupler 47-2 is optically connected to the port b of the optical filter 46-4.

One of two output ports of the split coupler 47-1 is optically connected to the port b of the optical filter 43-2, and the other is optically connected to the port b of the optical filter 46-6 as described above.

Similarly to the third modification, the input port of the split coupler 47-2 is optically connected to the port b of the optical filter 46-4, and one of two output ports is optically connected to the port b of the optical filter 46-5. The other output port of the split coupler 47-2 is optically connected to the port b of the optical filter 43-4 provided between the EDF 41 and the isolator 44-2.

With the above configuration, the pump light (with the 0.98-μm band wavelength) input from the OLT 2 side is input to the split coupler 47-1 through the optical filters 43-1 and 46-2 and split into two pump lights. Then, one of the split pump lights passes through the port b of the optical filter 43-2 and is input to the EDF 41 from the port a of the optical filter 43-2. Further, the other of the split pump lights passes through the port b of the optical filter 46-6 and is input to the PDF 42 from the port a of the optical filter 46-6.

In other words, one of the split pump lights is input to the EDF 41 in the same direction as a transmission direction of the downstream signal light (with the 1.49-μm band wavelength) amplified by the EDF 41, and thus, it corresponds to the forward pump light for the EDF 41. On the contrary, the other of the split pump lights is input to the PDF 42 in an opposite direction to a transmission direction of the upstream signal light (with the 1.3-μm band wavelength) amplified by the PDF 42, and thus, it corresponds to the backward pump light for the PDF 42.

Meanwhile, the pump light (with the 0.98-μm band wavelength) input from the ONU 6 side is input to the split coupler 47-2 through the optical filters 43-3 and 46-4 and is split into two pump lights. Then, one of the split pump lights split by the split coupler 47-2 passes through the port b of the optical filter 46-5 and is input to the PDF 42 from the port a of the optical filter 46-5. Further, the other of the split pump lights split by the split coupler 47-2 passes through the port b of the optical filter 43-4 and is input to the EDF 41 from the port a of the optical filter 43-4.

In other words, one of the split pump lights split by the split coupler 47-2 is input to the PDF 42 in the same direction as the transmission direction of the upstream signal light (with the 1.3-μm band wavelength) amplified by the PDF 42, and thus, it corresponds to the forward pump light for the PDF 42. On the contrary, the other of the split pump lights split by the split coupler 47-2 is input to the EDF 41 in the opposite direction to the transmission direction of the downstream signal light (with the 1.49-μm band wavelength) amplified by the EDF 41, and thus, it corresponds to the backward pump light for the EDF 41.

As described above, since both of the forward pump light and the backward pump light are input to each of the EDF 41 and the PDF 42, each of the EDF 41 and the PDF 42 is bidirectionally pumped. Therefore, in addition to the same or similar operational advantages as those in the example described above, amplification performances (may be referred to as amplification characteristics) of the EDF 41 and the PDF 42 are easily improved compared to the examples described above.

(Fifth Modification)

In the fourth modification described above, the pump lights input to the optical amplification repeater 4 from both of the OLT 2 side and the ONU 6 side are split and input to each of the optical amplification mediums 41 and 42. However, one of the pump lights input from the OLT 2 side and the ONU 6 side may be input to one of the optical amplification mediums 41 and 42, and the other may be input to the other one of the optical amplification mediums 41 and 42.

For example, the EDF 41 may amplify the downstream signal light by using the pump light input from the OLT 2 side, and the PDF 42 may amplify the upstream signal light by using the pump light input from the ONU 6 side. In this case, the pump light used in the optical amplification repeater 4 is not necessary to be split as described in the above examples.

Figure 14:
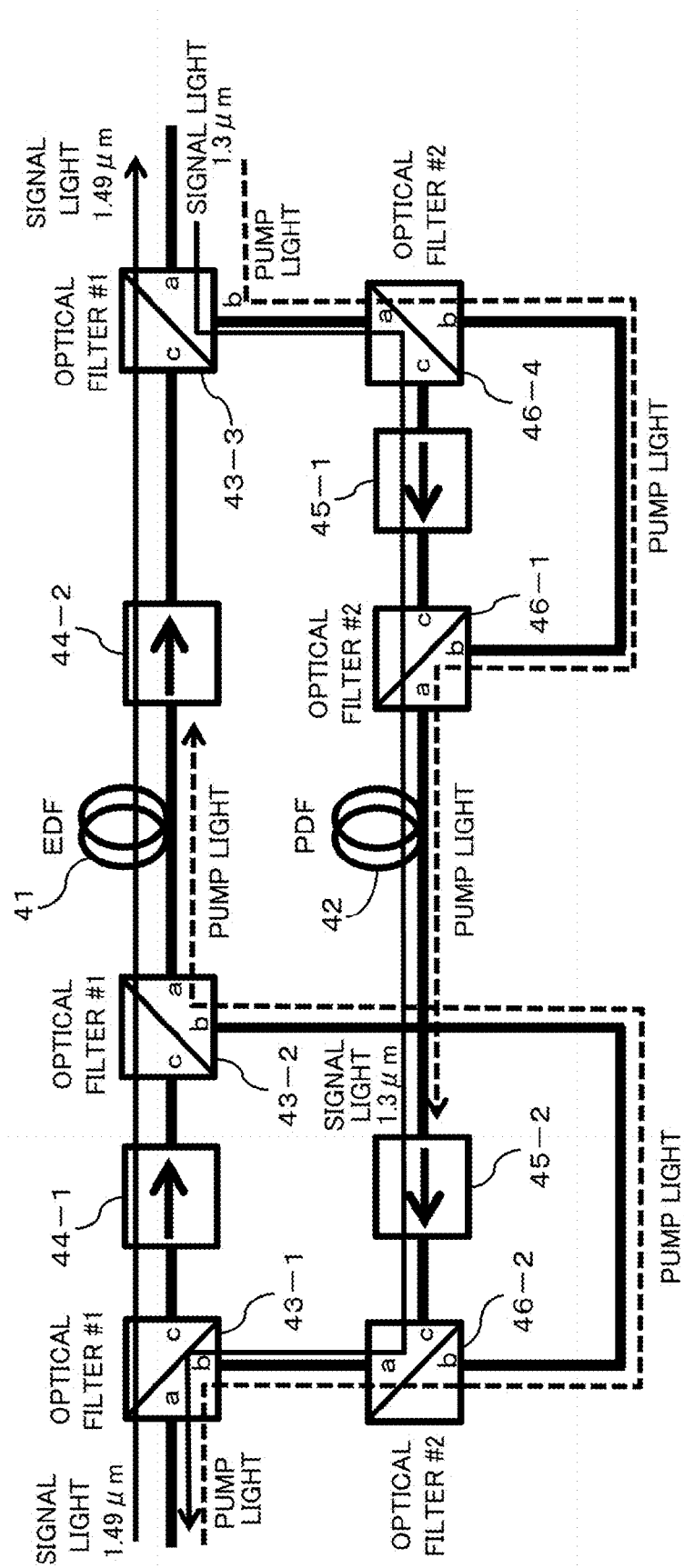
FIG. 14 is a block diagram illustrating a fifth modification of the optical amplification repeater illustrated in FIG. 2.

An exemplary configuration (a fifth modification) of the optical amplification repeater 4 in this example is illustrated in FIG. 14. The optical amplification repeater 4 illustrated in FIG. 14 is different from the configuration illustrated in FIG. 2 in that the split coupler 47 is not provided and that the optical filter 46-4 described in FIG. 12 is additionally provided between the optical filter 43-3 and the isolator 45-1.

As illustrated in FIG. 14, since the split coupler 47 is not provided, the port b of the optical filter 46-2, which is optically connected to the input port of the split coupler 47 in FIG. 2, is optically connected to the port b of the optical filter 43-2 in FIG. 14.

Thereby, the pump light (with the 0.98-μm band wavelength) input from the OLT 2 side is input to the port a of the optical filter 46-2 from the port b of the optical filter 43-1, passes through the port b from the port a of the optical filter 46-2, and is input to the port b of the optical filter 43-2. The pump light input to the port b of the optical filter 43-2 is input to the EDF 41 from the port a of the optical filter 43-2. In other words, the pump light input from the OLT 2 side is input to the EDF 41 in a route passing through the optical filters 43-1, 46-2 and 43-2 while bypassing the isolator 44-1.

Meanwhile, similarly to the case of FIG. 12, the ports a and c of the optical filter 46-4 are optically connected to the port b of the optical filter 43-3 and the input port of the isolator 45-1, respectively. However, the port b of the optical filter 46-4 is optically connected to the port b of the optical filter 46-1.

Thereby, the pump light (with the 0.98-μm band wavelength) input from the ONU 6 side is input to the port a of the optical filter 46-4 from the port b of the optical filter 43-3, and is input to the port b of the optical filter 46-1 from the port b of the optical filter 46-4. The pump light input to the port b of the optical filter 46-1 is input to the PDF 42 from the port a of the optical filter 46-1. In other words, the pump light input from the ONU 6 side is input to the PDF 42 in a route passing through the optical filters 43-3, 46-4 and 46-1 while bypassing the isolator 45-1.

As described above, in the optical amplification repeater 4 of the fifth modification described above, similarly to the aforementioned examples, the optical amplification mediums 41 and 42 can be remotely pumped by guiding the pump light to the optical amplification mediums 41 and 42 in the route bypassing the isolators 44-1 and 45-1. Therefore, the pump light sources for the respective optical amplification mediums 41 and 42 are not necessary in the optical amplification repeater 4, and therefore, the power supply system for the pump light source is also not necessary.

As described in the fourth and fifth modifications, in a case where the pump lights are input to the optical amplification repeater 4 from both sides of the OLT 2 and the ONU(s) 6, the wavelengths of the respective pump lights may be set to be different little by little from each other by using fiber grating, for example. Therefore, it is possible to reduce interference between the respective pump lights.

(Exemplary Configuration of OLT)

Figure 15:
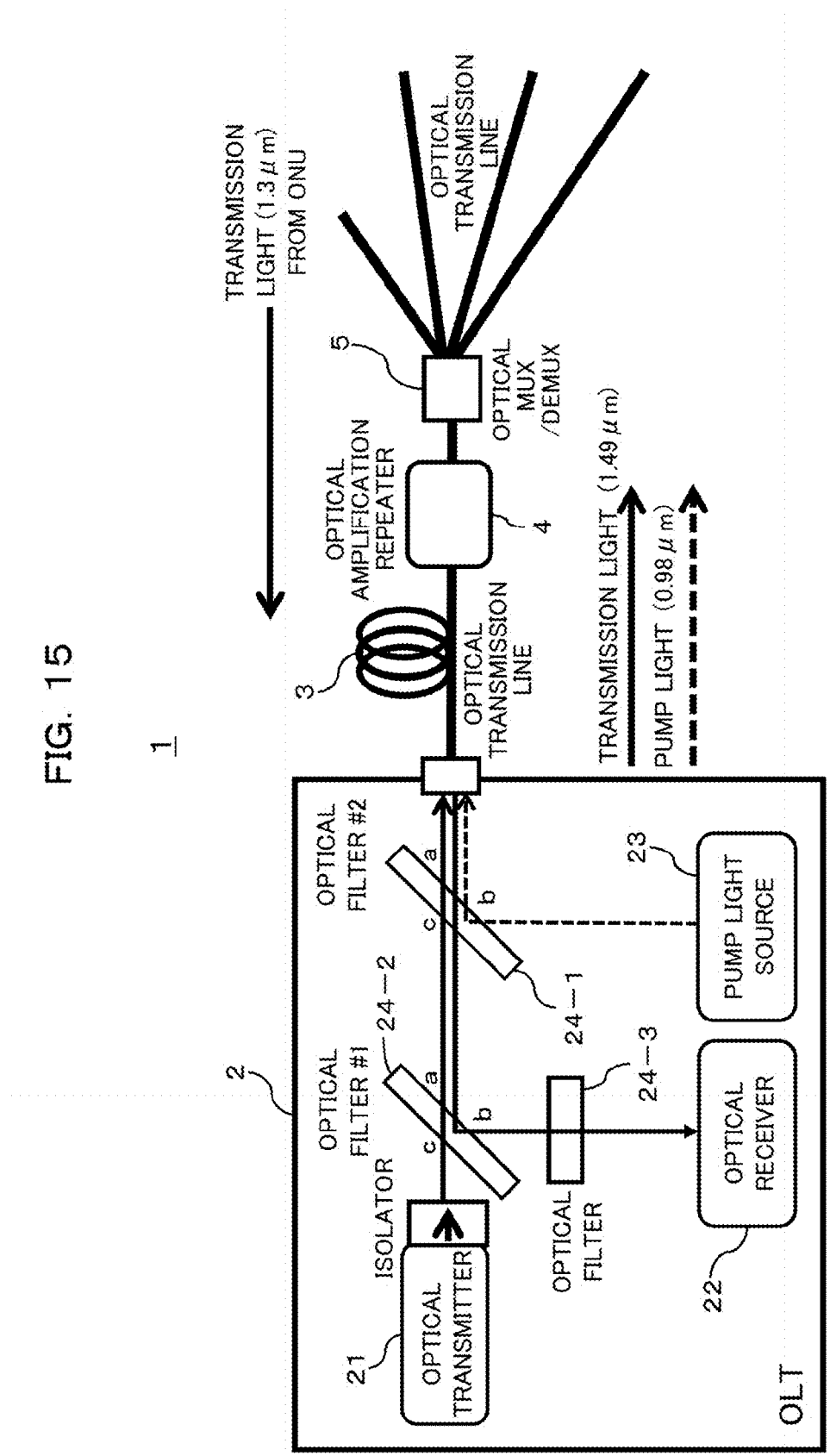
FIG. 15 is a block diagram illustrating an exemplary configuration focusing on an OLT of the PON system illustrated in FIG. 1.

FIG. 15 is a block diagram illustrating an exemplary configuration focusing on the OLT 2 of the PON system 1 illustrated in FIG. 1. The OLT 2 illustrated in FIG. 15 includes, for example, optical filters 24-1 to 24-3 in addition to the optical transmitter 21, the optical receiver 22, and the pump light source 23 mentioned above.

The optical filter 24-1 is provided at the output side of the optical transmitter 21, and the optical filter 24-2 is provided between the optical transmitter 21 and the optical filter 24-1.

The optical filter 24-1 may be the same optical filter as the above-mentioned optical filter 46-1 provided in the optical amplification repeater 4, for example. Therefore, the optical filter 24-1 may have, for example, the transmittance characteristic (or reflection characteristic) illustrated in FIGS. 8A and 8B.

Further, the optical filter 24-2 may be the same optical filter as the above-mentioned optical filter 43-2 provided in the optical amplification repeater 4, for example. Therefore, the optical filter 24-2 may have, for example, the transmittance characteristic (or reflection characteristic) illustrated in FIGS. 7A and 7B.

The ports a, b and c of the optical filter 24-1 are optically connected to the optical transmission line 3, the output port of the pump light source 23, and the port a of the optical filter 24-2 at the front stage, respectively. The ports a to c of the optical filter 24-2 are optically connected to the port a of the optical filter 24-1 at the rear stage, the input port of the optical filter 24-3, and the output port of the optical transmitter 21, respectively.

With the above connection relation, the downstream signal light (with the 1.49-μm band wavelength) output from the optical transmitter 21 passes through the port a from the port c of the optical filter 24-2 and is input to the port c of the optical filter 24-1 at the rear stage. Further, the pump light (with the 0.98-μm band wavelength) output from the pump light source 23 is input to the port b of the optical filter 24-1.

The downstream signal light input to the port c of the optical filter 24-1 is output from the port a of the optical filter 24-1, and the pump light input to the port b of the optical filter 24-1 is output from the port a of the optical filter 24-1. Therefore, the downstream signal light and the pump light are output to the optical transmission line 3 from the port a of the optical filter 24-1.

Meanwhile, the upstream signal light (with the 1.3-μm band wavelength) received from the optical transmission line 3 is input to the port a of the optical filter 24-1 and is input to the port a of the optical filter 24-2 from the port c of the optical filter 24-1. The upstream signal light input to the port a of the optical filter 24-2 is input to the optical filter 24-3 from the port b of the optical filter 24-2.

The optical filter 24-3 has, for example, a transmittance characteristic of cutting off a noise component contained in the upstream signal light and inputs the signal light substantially not containing the noise component to the optical receiver 22.

As described above, the OLT 2 is available to transmit the pump light together with the downstream signal light to the optical transmission line 3 and is available to receive the upstream signal light received from the optical transmission line 3 by the optical receiver 22.

(First Modification of OLT)

Figure 16:
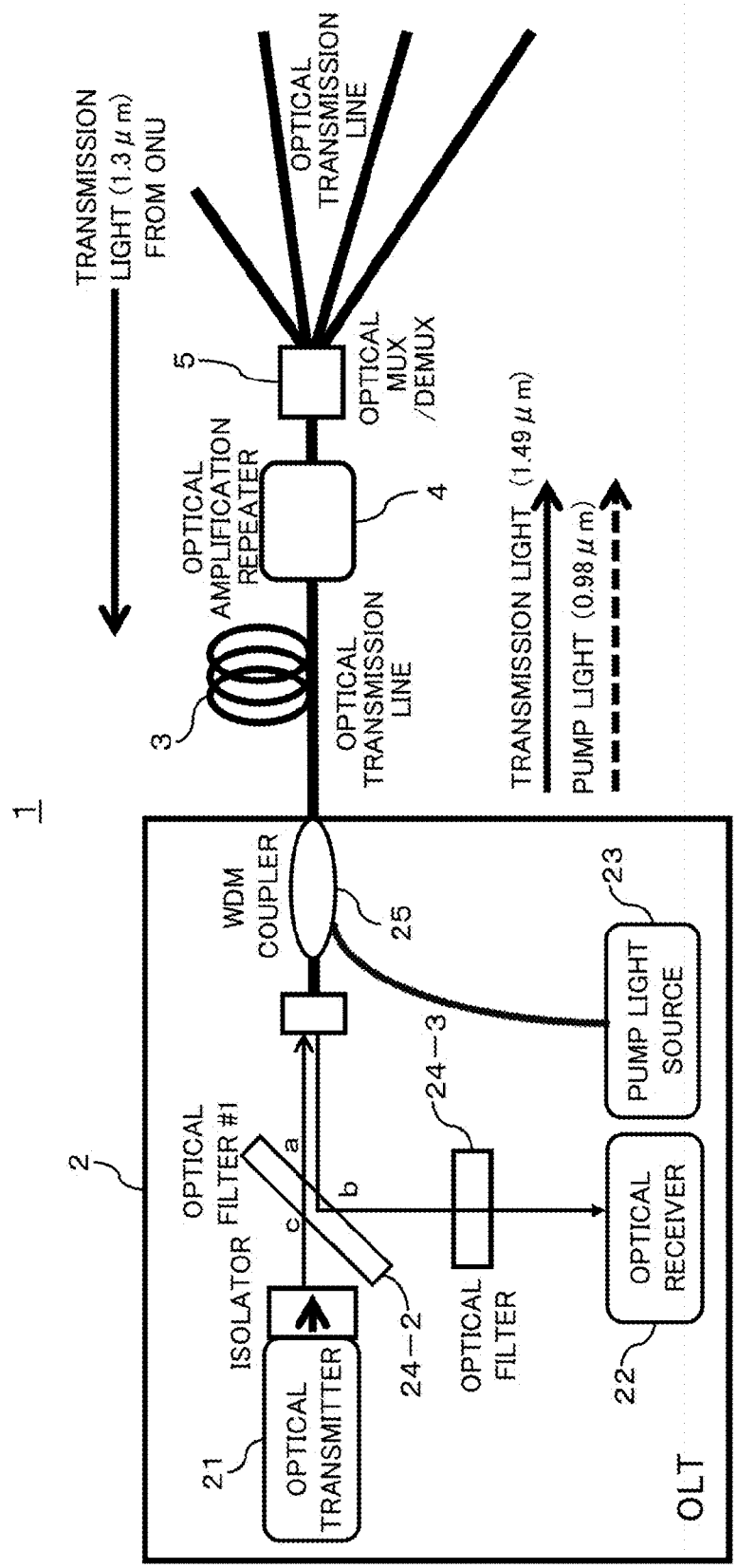
FIG. 16 is a block diagram illustrating a first modification of the OLT illustrated in FIG. 15.

In the example of FIG. 15, the optical filter 24-1 is used as an example of the configuration of guiding the pump light output from the pump light source 23 to the optical transmission line 3. However, as illustrated in FIG. 16, the pump light may be guided to the optical transmission line 3 by using a wavelength division multiplexing (WDM) coupler 25, for example.

(Second Modification of OLT)

Figure 17:
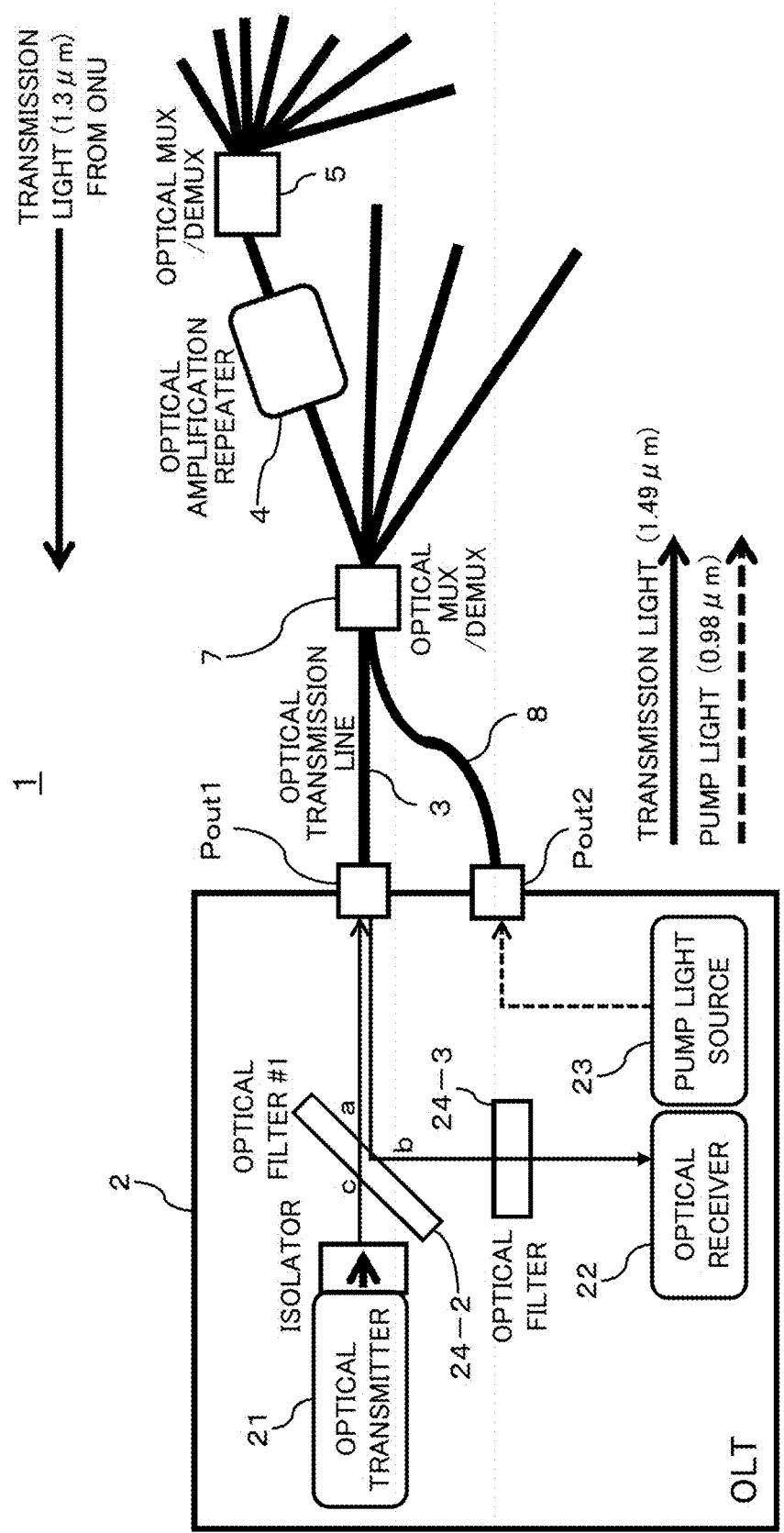
FIG. 17 is a block diagram illustrating a second modification of the OLT illustrated in FIG. 15.

Further, as illustrated in FIG. 17, in addition to the optical MUX/DMUX 5, another optical MUX/DMUX 7 may be provided in the optical transmission line 3 between the OLT 2 and the optical amplification repeater 4 (a first output port Pout1). The optical MUX/DMUX 7 may include, for example, a plurality (two in the example of FIG. 17) of input ports, and any one of the input ports is connected to the optical transmission line 3 to input the downstream signal light transmitted from the OLT 2 (the first output port Pout1) to the MUX/DMUX 7.

Herein, the optical MUX/DMUX 7 may have an unused input port among the input ports other than the input ports connected to the optical transmission line 3. In this case, as illustrated in FIG. 17, the pump light output from the pump light source 23 may be guided to the unused input port from a second output port Pout2 of the OLT 2 through another optical transmission line 8.

In this configuration, the optical filter 24-1 illustrated in FIG. 15 and the WDM coupler 25 illustrated in FIG. 16 are not necessary in the OLT 2. Therefore, it is possible to reduce the insertion loss of a transmission route of the downstream signal light (in other words, to improve transmission characteristics of the signal light) and/or to downsize the OLT 2.

(Third Modification of OLT)

Figure 18:
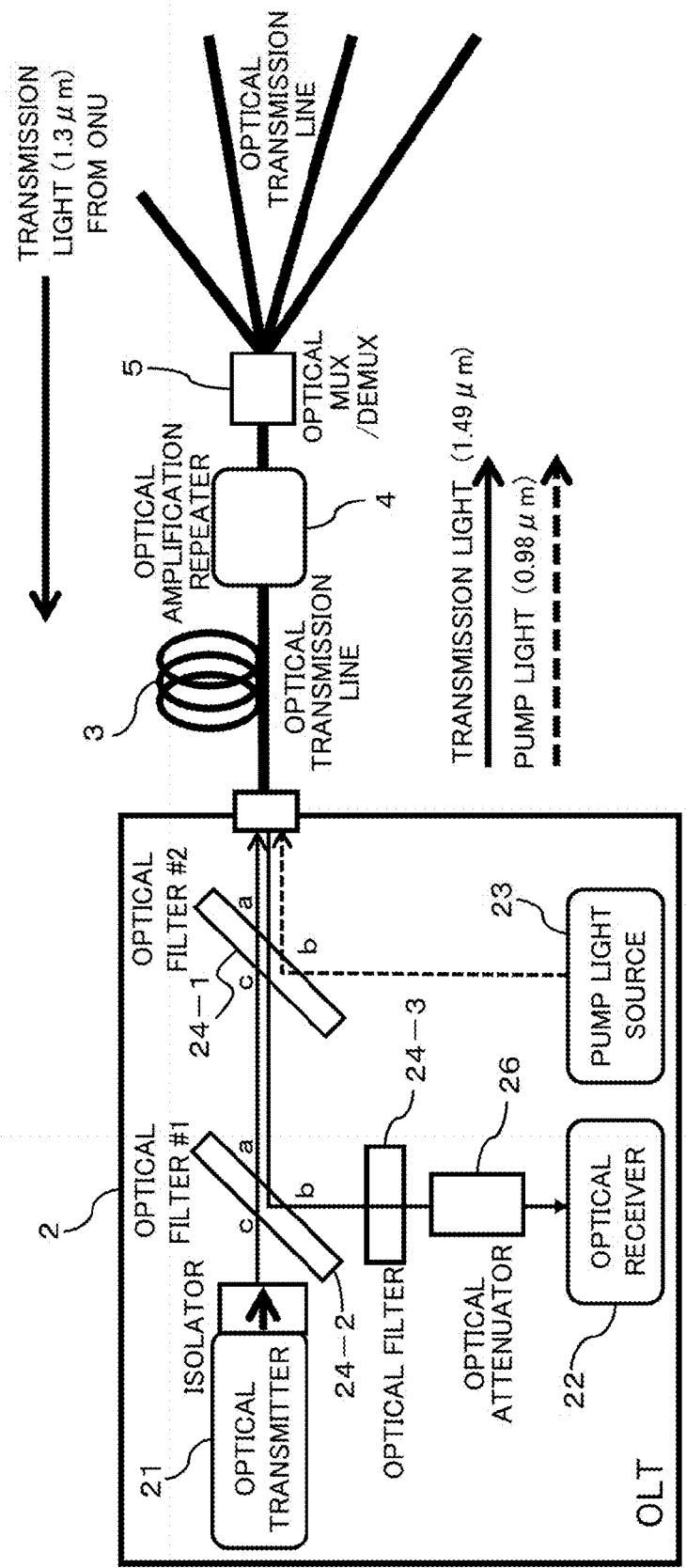
FIG. 18 is a block diagram illustrating a third modification of the OLT illustrated in FIG. 15.

As illustrated in FIG. 18, an optical attenuator 26 may be provided between the optical filter 24-3 and the optical receiver 22 illustrated in FIGS. 15 to 17 that configure an optical reception system. The optical attenuator 26 may be a variable optical attenuator (VOA) of which the optical attenuation amount is variable. However, the optical attenuator 26 may be an optical attenuator of which the optical attenuation amount is fixed. In other words, the optical attenuator 26 is an example of an optical component available to adjust or control (or limit) an optical power of the upstream signal light input to the optical receiver 22.

One of the reasons why the optical attenuator 26 is provided in the optical reception system is that the remote pump light transmitted from the pump light source 23 of the OLT 2 together with the downstream signal light may be used to amplify the upstream signal light in the optical amplification repeater 4 as described above.

For example, upon adjusting a pump light output power of the pump light source 23, amplification gains of both of the optical amplification mediums 41 and 42 of the downstream and the upstream are changed depending on the adjustment in the configurations of the optical amplification repeater 4 illustrated in FIGS. 2, 9, 11, and 13.

Therefore, upon adjusting (for example, increasing) an output power (hereinafter, may also be referred to as a "pump light power") of the pump light depending on the transmission distance of the downstream signal light and the number of subscribers, the power of the upstream signal light may also be increased. However, the pump light power is adjusted (may also be referred to as "optimized") in a range not exceeding an allowable reception power of the ONU 6 that receives the downstream signal light. Therefore, even though the pump light power does not exceed the allowable reception power in the ONU 6, the power of the upstream signal light received by the OLT 2 may exceed an allowable reception power of the optical receiver 22.

Hence, the power of the upstream signal light is adjusted or limited by using the optical attenuator 26 so that the input light power to the optical receiver 22 of the upstream signal light falls within the range of the allowable reception power. Thereby, it is possible to prevent the optical receiver 22 from being input the signal light power beyond the allowable reception power, which may cause a failure of the optical receiver 22, in response to the adjustment of the pump light power within the range not exceeding the allowable reception power of the ONU 6.

The ONU 6 may notify the OLT 2 of reception power information of the downstream signal light by using the upstream signal light, for example. The OLT 2 is possible to adjust (or control) the pump light power of the pump light source 23 based on the reception power information notified from the ONU 6. Further, by applying the VOA as the optical attenuator 26, the OLT 2 is possible to monitor the input optical power of the VOA 26 and to adjust (or control) the optical attenuation amount of the VOA 26 such that the monitor result does not exceed the allowable reception power of the optical receiver 22.

In other words, the OLT 2 may be provided with a controller operable to control the pump light power in the range not exceeding the allowable reception power of the ONU 6 and to control the optical attenuation amount of the VOA 26 in response to the pump light power control such that the power of the upstream signal light does not exceed the allowable reception power of the optical receiver 22.

(Fourth Modification of OLT)

As described above, since the power of the pump light transmitted to the downstream from the OLT 2 is adjusted by using the optical attenuator 26, it is possible to prevent the optical receiver 22 from being input the power of the upstream signal light exceeding the allowable reception power.

However, since the power of the upstream signal light is changed depending on a transmission optical power of each ONU 6, it is preferable to determine (or control) the attenuation amount of the optical attenuator 26 in consideration of not only the pump light power but also the transmission optical power of each ONU 6.

Herein, the power of the upstream signal light transmitted from each ONU 6 may be changed in a burst manner. For example, as illustrated in FIG. 19, the PON system 1 may time-divisionally transmit or receives each of the downstream signal light and the upstream signal light.

For example, with focusing on the transmission between the OLT 2 and three ONUs 6-1 to 6-3 (#A to #C), the OLT 2 is available to transmit the downstream signal light addressed to the ONUs #A to #C in predetermined time slots A to C, respectively. The ONUs #A to #C respectively selects the time slots A to C designated from the OLT 2 to receive the downstream signal light.

Meanwhile, each of the ONUs #A to #C is available to transmit the upstream signal lights in the time slots A to C designated from the OLT 2, and the OLT 2 is available to identify each of the time slots A to C to perform a reception process of the upstream signal lights transmitted by the ONUs #A to #C.

Figure 19:
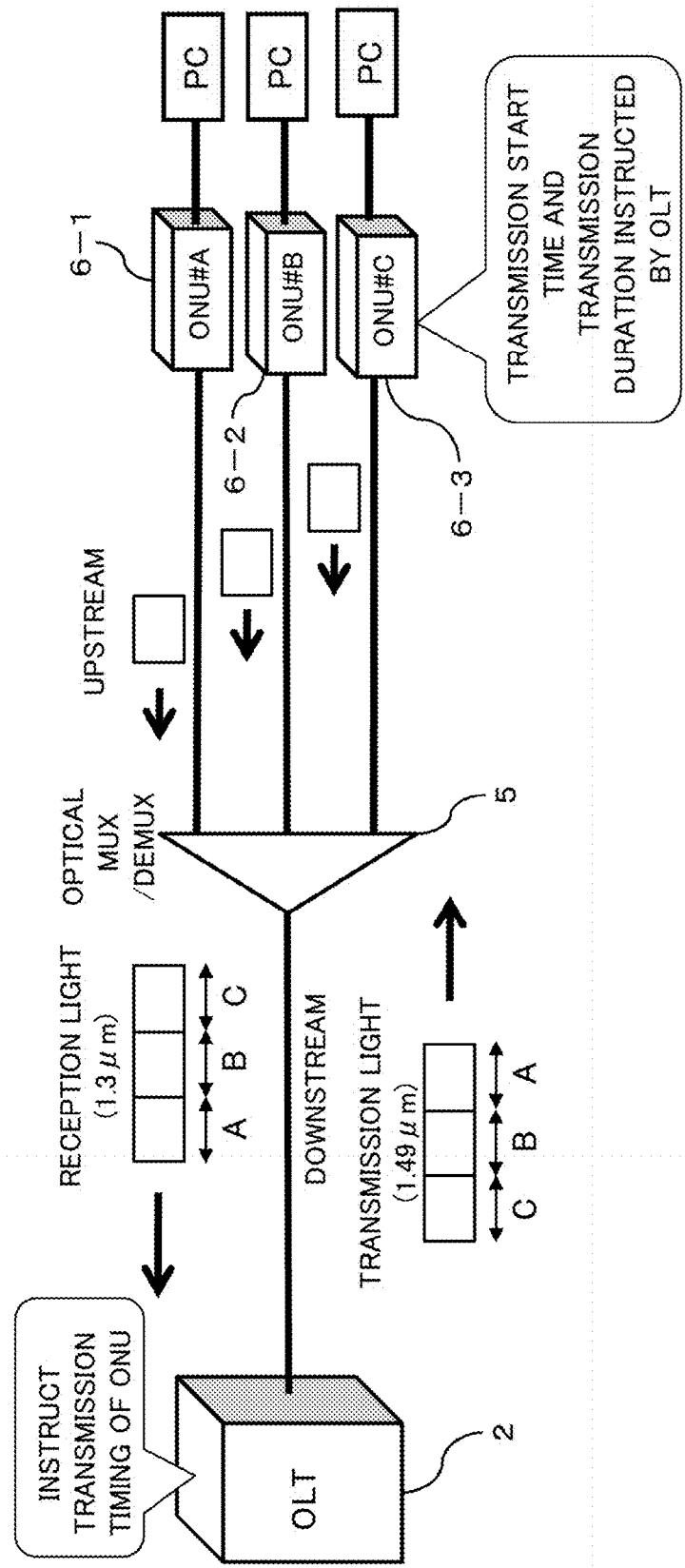
FIG. 19 is a diagram for illustrating bidirectional time-division communication performed in the PON system.

In FIG. 19, for the convenience sake, the "time slots" of the downstream and the upstream are denoted by using the same symbols (A to C), the "time slots" of the downstream and the upstream may be independent from each other.

Herein, the downstream signal light transmitted by the OLT 2 can be maintained constant in each of the time slots A to C but the power of the upstream signal light received by the OLT 2 is not necessarily maintained constant in each of the time slots A to C.

For example, the power of the upstream signal light may be changed in each of the time slots A to C depending on the amount of data to be transmitted by a terminal such as a personal computer (PC) or a server connected to the ONU 6. Such a circumstance is schematically illustrated in FIG. 20.

Figure 20:
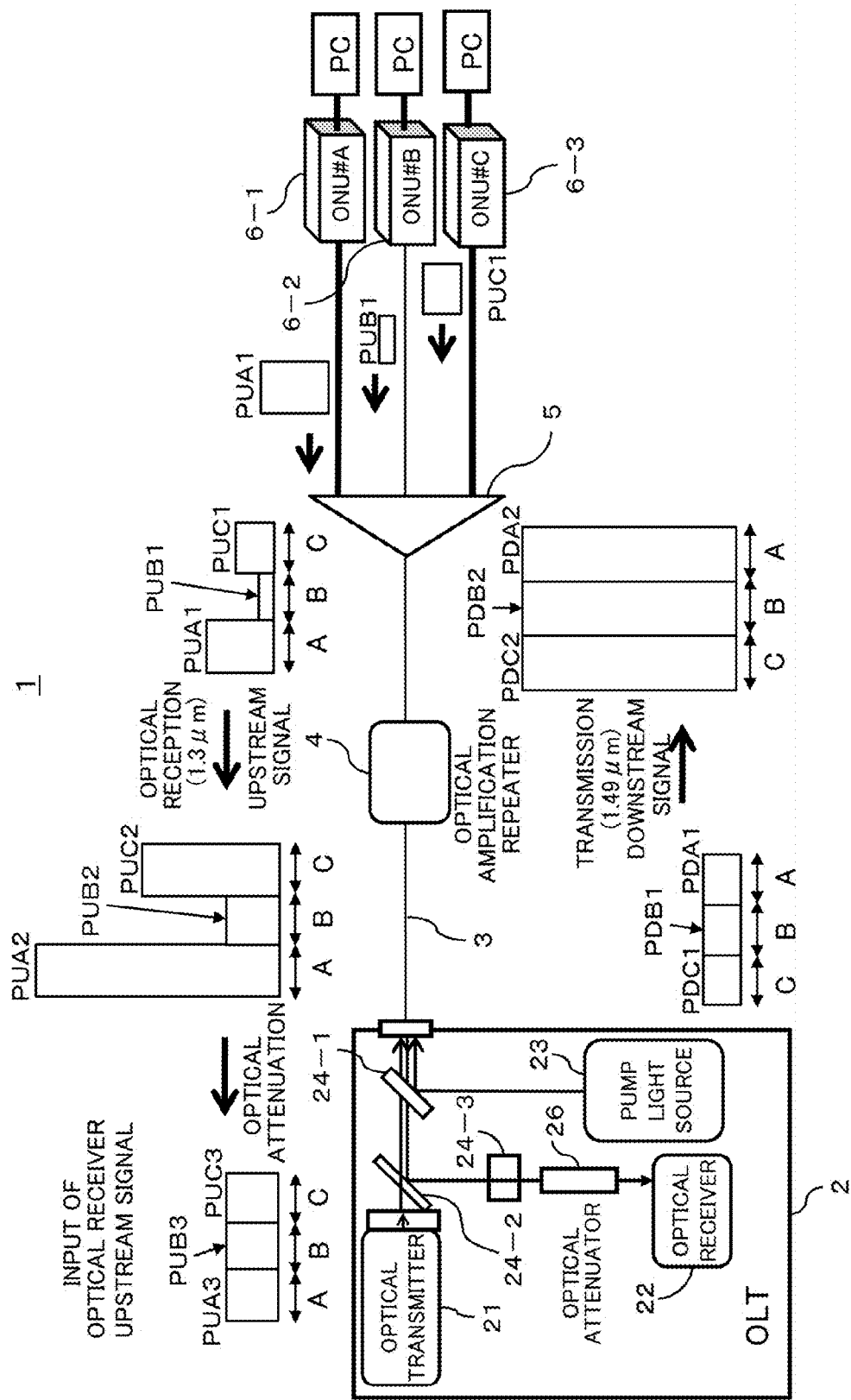
FIG. 20 is a diagram for illustrating a temporal (or burst) change of an upstream signal light in the PON system.

As illustrated in FIG. 20, the OLT 2 transmits the signal lights having constant optical powers PDA1, PDB1, and PDC1 (for example, PDA1=PDB1=PDC1) in the respective time slots A to C to the optical transmission line 3. The signal lights are input to the optical amplification repeater 4 through the optical transmission line 3 and are amplified by the same amplification gain in each of the time slots A to C by the optical amplification medium 41 for the downstream.

Therefore, the downstream signal lights of the respective time slots A to C are amplified, for example, to have the constant optical powers PDA2, PDB2, and PDC2 (for example, PDA2=PDB2=PDC2) in the respective time slots A to C and transmitted to the optical MUX/DMUX 5.

On the contrary, the ONUs #A to #C are allowed to independently transmit the upstream signal lights with transmission optical powers PUA1, PUB1, and PUC1 (for example, PUB1<PUC1<PUA1) in the time slots A to C designated from the OLT 2. The signal lights are combined by the optical MUX/DMUX 5. The combined signal light is input to the optical amplification repeater 4 and is amplified by the same amplification gain in each of the time slots A to C through the optical amplification medium 42 for the upstream.

Therefore, the upstream signal lights of the respective time slots A to C are amplified, for example, to have powers PUA2, PUB2, and PUC2 (for example, PUB2<PUC2<PUA2) while maintaining a power ratio before the amplification and are transmitted to the optical transmission line 3. As a result, the upstream signal lights having different powers in the respective time slots A to C may be input to the OLT 2. In other words, the power of the upstream signal light received by the OLT 2 may be changed in time. The signal light of which the optical power is changed in time may be referred to as a "burst signal light".

When the OLT 2 receives the burst signal light, the input optical power to the optical receiver 22 may exceed the allowable reception power, even though the pump light power transmitted by the OLT 2 to the downstream (to the optical amplification repeater 4) is adjusted as described above. As a non-limiting example, it is assumed that the reception optical power PUB2 in the time slot B does not exceed the allowable reception power of the optical receiver 22 but the reception optical powers PUA2 and PUC2 in the time slots A and C exceed the allowable reception power of the optical receiver 22.

In this case, the reception optical powers PUA2 and PUC2 of at least the time slots A and C are attenuated to be equal to or lower than the allowable reception power by controlling the attenuation amount of the optical attenuator 26 in a unit of time slot. Thereby, it is possible to keep the reception optical powers PUA2, PUB2, and PUC2 in the respective time slots A to C to be the allowable reception power or lower of the optical receiver 22.

Figure 21:
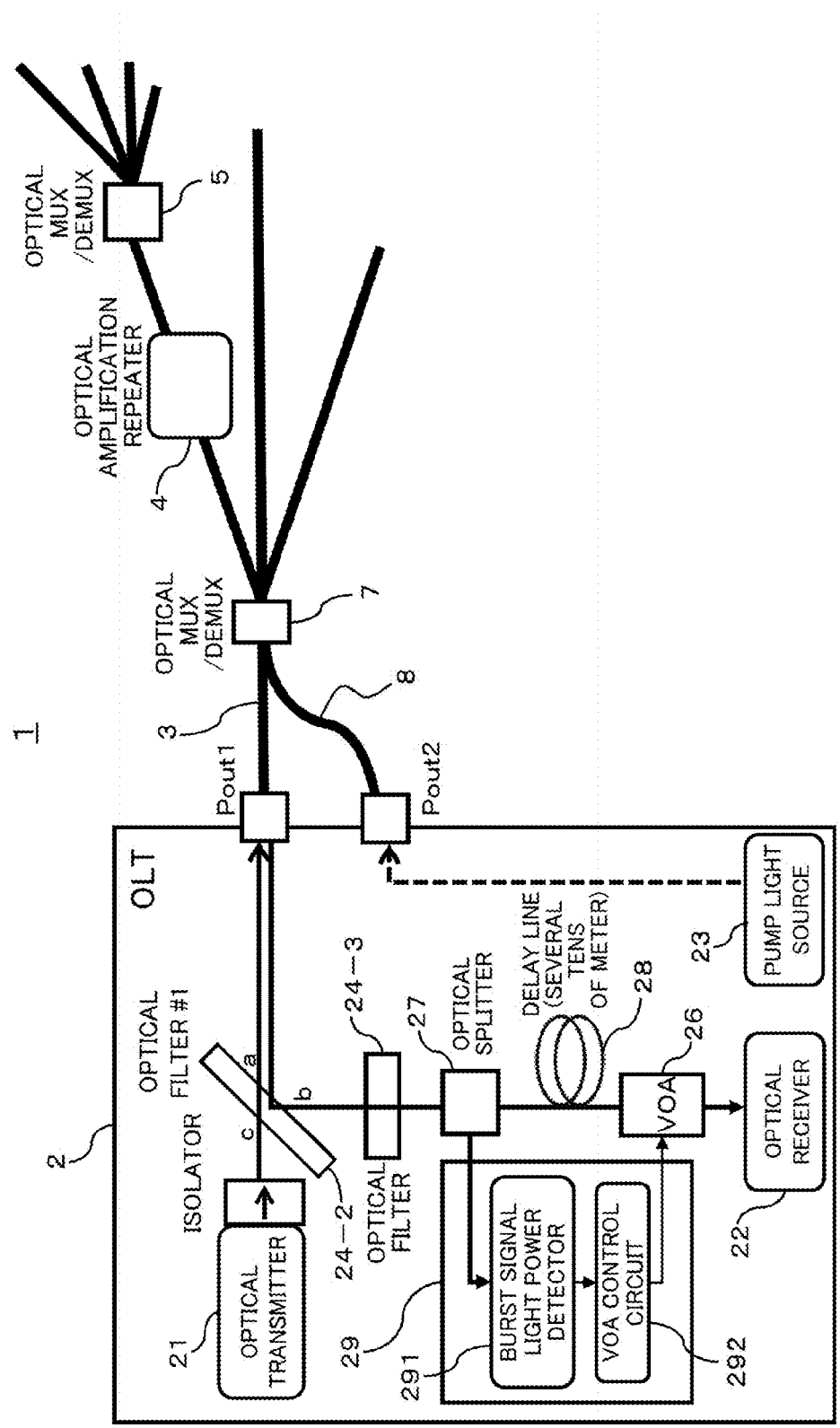
FIG. 21 is a block diagram illustrating a fourth modification of the OLT illustrated in FIG. 15.

An exemplary configuration of the OLT 2 operable to control the attenuation amount of the optical attenuator 26 in a unit of time slot is illustrated in FIG. 21. The OLT 2 illustrated in FIG. 21 includes, for example, the variable optical attenuator (VOA) 26, an optical splitter 27, and a delay line 28 in an optical path between the optical filter 24-3 and the optical receiver 22 illustrated in FIG. 17, and includes a controller 29 to control the attenuation amount of the VOA 26. The controller 29 includes, for example, a burst signal light power detector 291 and a VOA control circuit 292. The controller 29 may be configured by electric circuits. A VOA control system illustrated in FIG. 21 is applicable to the OLT 2 with the configuration illustrated in FIG. 15 or 16.

The optical splitter 27 splits the upstream signal light (with the 1.3-μm band wavelength) passed through the optical filter 24-3 into two signal lights, outputs one of the split signal lights to the delay line 28, and outputs the other of the split signal lights to the burst signal light power detector 291 of the controller 29, for example. An optical splitter is applicable to the optical splitter 27, for example.

The delay line 28 adjusts (or delays) an input timing of the signal light to the VOA 26 according to a time taken for controlling the attenuation amount of the VOA (may also be referred to as a "VOA loss") by the controller 29. For example, the input timing of the signal light to the VOA 26 is adjusted by the delay line 28 such that a control timing of the VOA loss and a time slot of a control target of the VOA loss are matched with each other.

The delay line 28 may be an optical fiber and can be configured to adjust an optical delay amount according to its length. Therefore, the delay line 28 may be set according to a relation between the control timing of the VOA loss and the time slot of the control target of the VOA loss. As a non-limiting example, the length of the delay line 28 is tens of meters or so.

The burst signal light power detector 291 of the controller 29 may be configured to detect the optical power of the signal light input from the optical splitter 27 in a unit of time slot, for example. The detection result is given to the VOA control circuit 292. The burst signal light power detector 291 may be referred to as a "time-slot signal-light power detector 291".

The VOA control circuit 292 is operable to control the VOA loss in a unit of time slot such that the signal light power of each time slot becomes equal to or less than the allowable reception level of the optical receiver 22 based on a signal light power of each time slot detected by the burst signal light power detector 291.

The VOA loss is controlled in a unit of time slot in response to the control of the VOA control circuit 292 to adjust the signal light power input to the optical receiver 22 through the delay line 28 in a unit of time slot. Therefore, the VOA 26 may support a control response speed at which the VOA loss is controllable in a unit of time slot.

As described above, with the configuration in which the OLT 2 includes the VOA control system operable in a unit of time slot, it is possible to adjust the burst signal light of the upstream to be equal to or less than the allowable reception power of the optical receiver 22 in a unit of time slot. Therefore, it is possible to prevent the optical receiver 22 of the OLT 2 from being broken down by the upstream burst signal light. In other words, the OLT 2 is possible to stably operate a reception process of the upstream signal light.

The above-described time-divisional VOA loss control is effective or helpful for a case where the light power beyond the allowable reception power is inclined to input to the OLT 2 (the optical receiver 22) due to an optimization of the pump light power of the pump light source 23 depending on the transmission speed and the transmission capacity of the downstream signal light.

COMPARATIVE EXAMPLES

Next, in the following, comparative examples with respect to the optical amplification repeater 4 according to the embodiment and the modifications described above will be described with reference to FIGS. 22 to 27.

First Comparative Example

Figure 22:
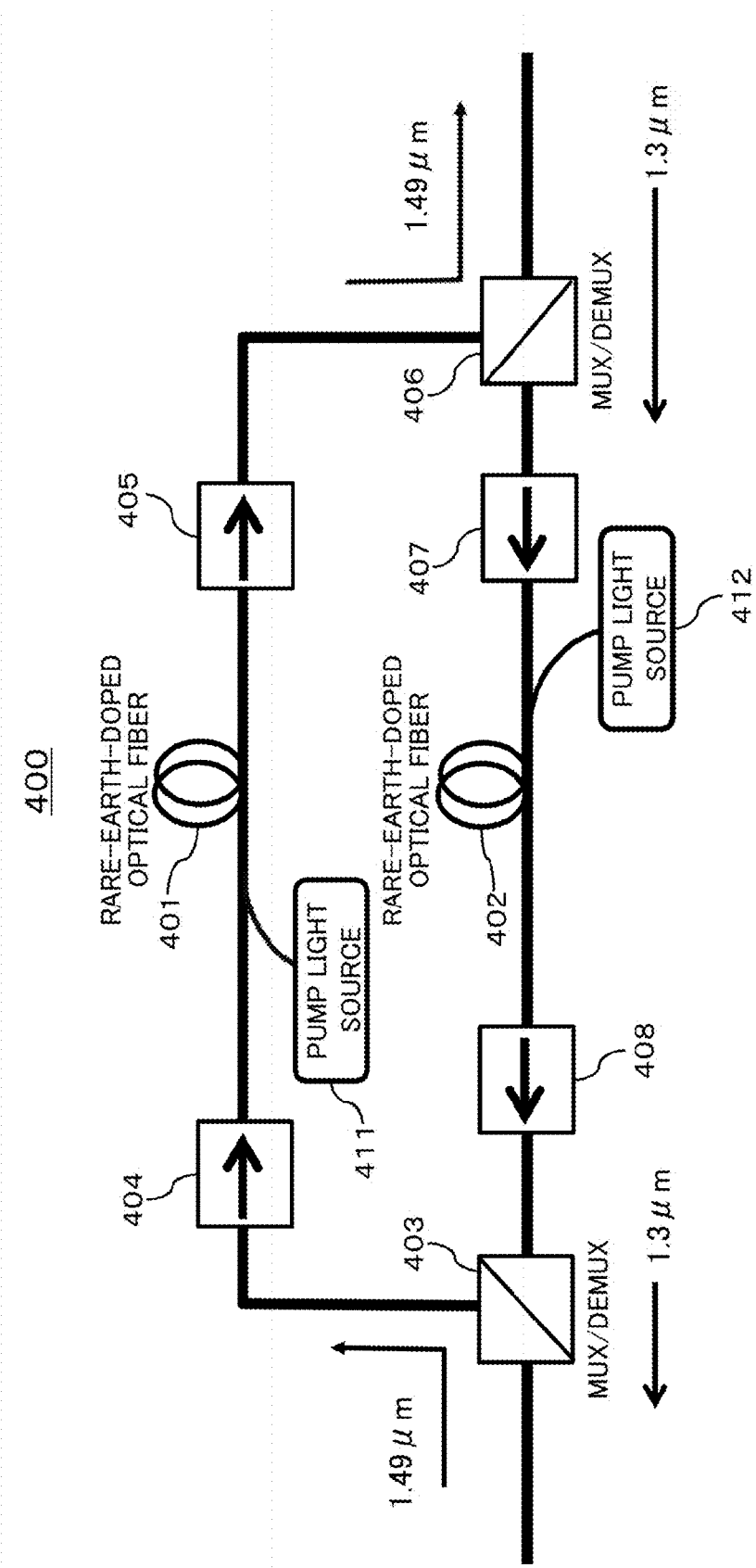
FIG. 22 is a block diagram illustrating a first comparative example with respect to the optical amplification repeater illustrated in FIGS. 1 to 20.

FIG. 22 is a block diagram illustrating an exemplary configuration of an optical amplification repeater 400 as a first comparative example with respect to the optical amplification repeater 4 described above. Similarly to the optical amplification repeater 4, the optical amplification repeater 400 illustrated in FIG. 22 is applicable to an optical path between the OLT 2 and the optical MUX/DMUX 5.

As illustrated in FIG. 22, the optical amplification repeater 400 includes rare-earth-doped optical fiber amplifiers 401 and 402 and pump light sources 411 and 412 for the rare-earth-doped optical fiber amplifiers 401 and 402. In order to secure a stable amplification, isolators 404 and 405 are provided at the input and output sides of the rare-earth-doped optical fiber amplifier 401, and isolators 407 and 408 are provided at the input and output sides of the rare-earth-doped optical fiber amplifier 402.

A MUX/DMUX 403 is provided at the input side of the isolator 404 (at the output side of the isolator 408), and a MUX/DMUX 406 is provided at the output side of the isolator 405 (at the input side of the isolator 407).

The MUX/DMUX 403 guides the downstream signal light, which is input from an OLT and has the 1.49-μm band wavelength, to the isolator 404 provided at the input side of the rare-earth-doped optical fiber amplifier 401. Further, the MUX/DMUX 403 guides the upstream signal light, which passes through the isolator 408 provided at the output side of the rare-earth-doped optical fiber amplifier 402 and has the 1.3-μm band wavelength, to the OLT.

The multiplexer and demultiplexer 406 guides the upstream signal light, which is input from an ONU and has the 1.3-μm band wavelength, to the isolator 407 provided at the input side of the rare-earth-doped optical fiber amplifier 402. Further, the MUX/DMUX 406 guides the downstream signal light, which passes through the isolator 405 provided at the output side of the rare-earth-doped optical fiber amplifier 401 and has the 1.49-μm band wavelength, to the ONU.

The rare-earth-doped optical fiber amplifier 401 is pumped (forward pumped) by the pump light input from the pump light source 411 and amplifies the downstream signal light with the 1.49-μm band wavelength, which is input through the MUX/DMUX 403 and the isolator 404.

The rare-earth-doped optical fiber amplifier 402 is pumped (backward pumped) by the pump light input from the pump light source 412 and amplifies the upstream signal light the 1.3-μm band wavelength, which is input through the MUX/DMUX 406 and the isolator 407.

In this way, the optical amplification repeater 400 illustrated in FIG. 22 can amplify the downstream signal light and the upstream signal light using the rare-earth-doped optical fiber amplifiers 401 and 402 pumped by the individual pump light sources 411 and 412. However, a power supply system is needed to supply power of the pump light sources 411 and 412.

Second Comparative Example

Figure 23:
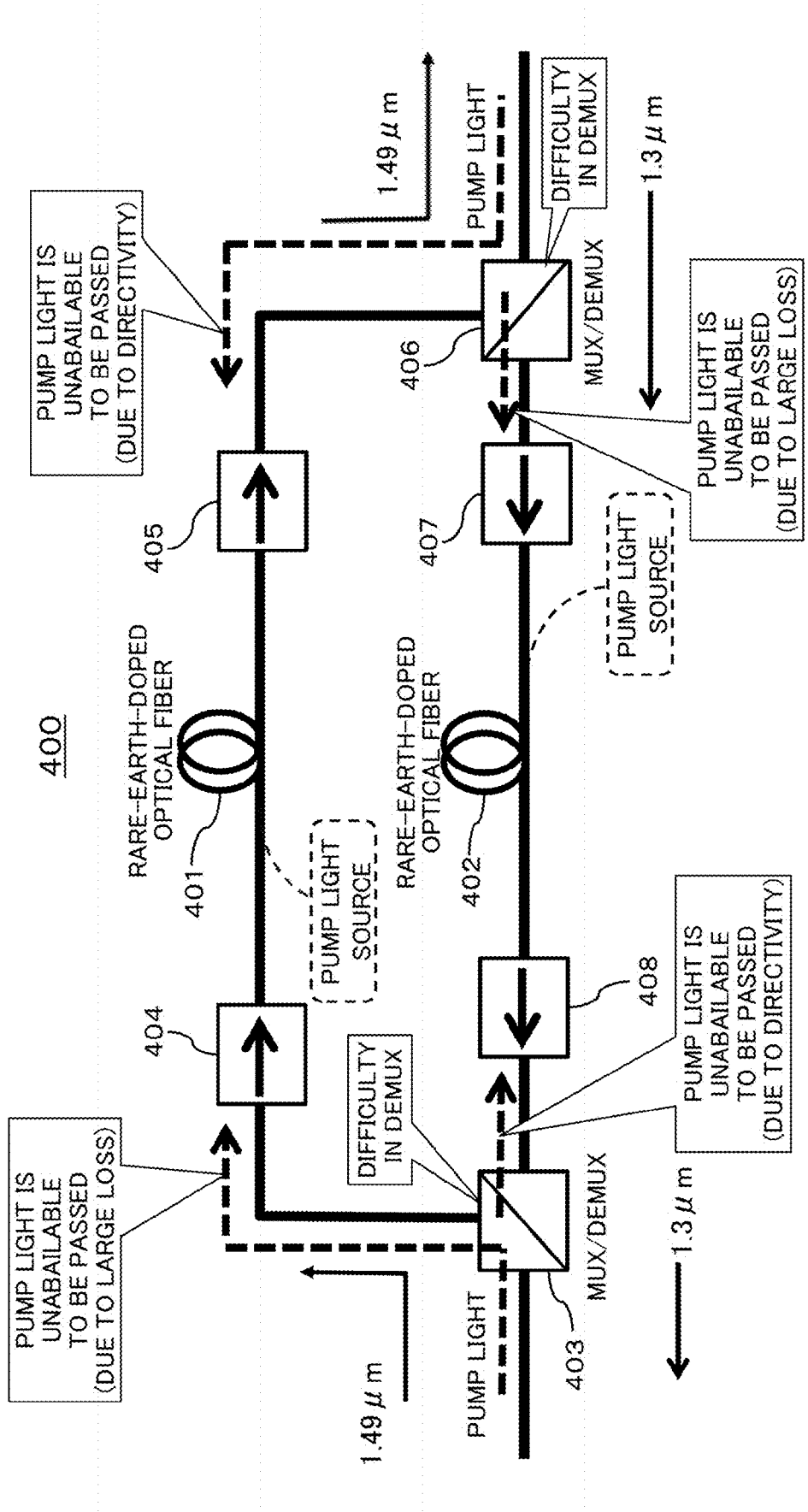
FIG. 23 is a block diagram illustrating a second comparative example with respect to the optical amplification repeater illustrated in FIGS. 1 to 20.

Therefore, as illustrated in FIG. 23, the pump light sources 411 and 412 are not provided in the optical amplification repeater 400, and instead a configuration (a remote pump configuration) may be considered in which the pump lights to pump the respective rare-earth-doped optical fiber amplifiers 401 and 402 are input to the optical amplification repeater 400 from the OLT and the ONU.

In the configuration illustrated in FIG. 23, in order to realize remote pump of the rare-earth-doped optical fiber amplifiers 401 and 402, the MUX/DMUXs 403 and 406 are required to have characteristics available to separate the signal light wavelength and the pump light wavelength. However, it is difficult to realize the MUX/DMUXs 403 and 406 that are available to separate the pump light wavelength (for example, the 0.98-μm band wavelength) and the signal light wavelength (for example, the 1.49-μm band wavelength and the 1.3-μm band wavelength) that is longer than the above pump light wavelength.

Even if the pump light wavelength and the signal light wavelength can be separated by the MUX/DMUXs 403 and 406, the guiding of the pump light is interrupted by the isolators 404 and 405 (or 407 and 408) provided for the stable amplification of the rare-earth-doped optical fiber amplifier 401 (or 402).

For example, when the pump light received from the OLT is separated by the MUX/DMUX 403 to try to guide the pump light to the rare-earth-doped optical fiber amplifiers 401 and 402, the pump light needs to pass through the isolators 404 and 408 in a downstream direction.

However, even though the pump light is guided to the isolator 408 (to the output side of the isolator 408) from the MUX/DMUX 403, the pump light is unavailable to pass through the isolator 408 due to the directivity of the isolator 408. Therefore, it is unavailable to guide the pump light to the rare-earth-doped optical fiber amplifier 401.

Meanwhile, when the pump light is guided to the isolator 404 (the input side of the isolator 404) from the MUX/DMUX 403, the pump light is unavailable to pass through the isolator 404 due to wavelength dependency of the insertion loss (or bandwidth limitation) of the isolator 404, as described with reference to FIG. 6. Therefore, it is unavailable to guide the pump light to the rare-earth-doped optical fiber amplifier 401.

Even in a case where the pump light received from the ONU is separated by the MUX/DMUX 406 and guided to both of the rare-earth-doped optical fiber amplifiers 401 and 402, the above circumstance is also applied. For example, even when the pump light is guided to the isolator 405 (the output side of the isolator 405) from the MUX/DMUX 406, the pump light is unavailable to pass through the isolator 405 due to the directivity of the isolator 405. Therefore, it is unavailable to guide the pump light to the rare-earth-doped optical fiber amplifier 401.

Further, when the pump light is guided to the isolator 407 (the input side of the isolator 407) from the MUX/DMUX 406, the pump light is unavailable to pass through the isolator 407 due to the wavelength dependency of the insertion loss (or bandwidth limitation) of the isolator 407, as described with reference to FIG. 6. Therefore, it is unavailable to guide the pump light to the rare-earth-doped optical fiber amplifier 402.

Third Comparative Example

Figure 24:
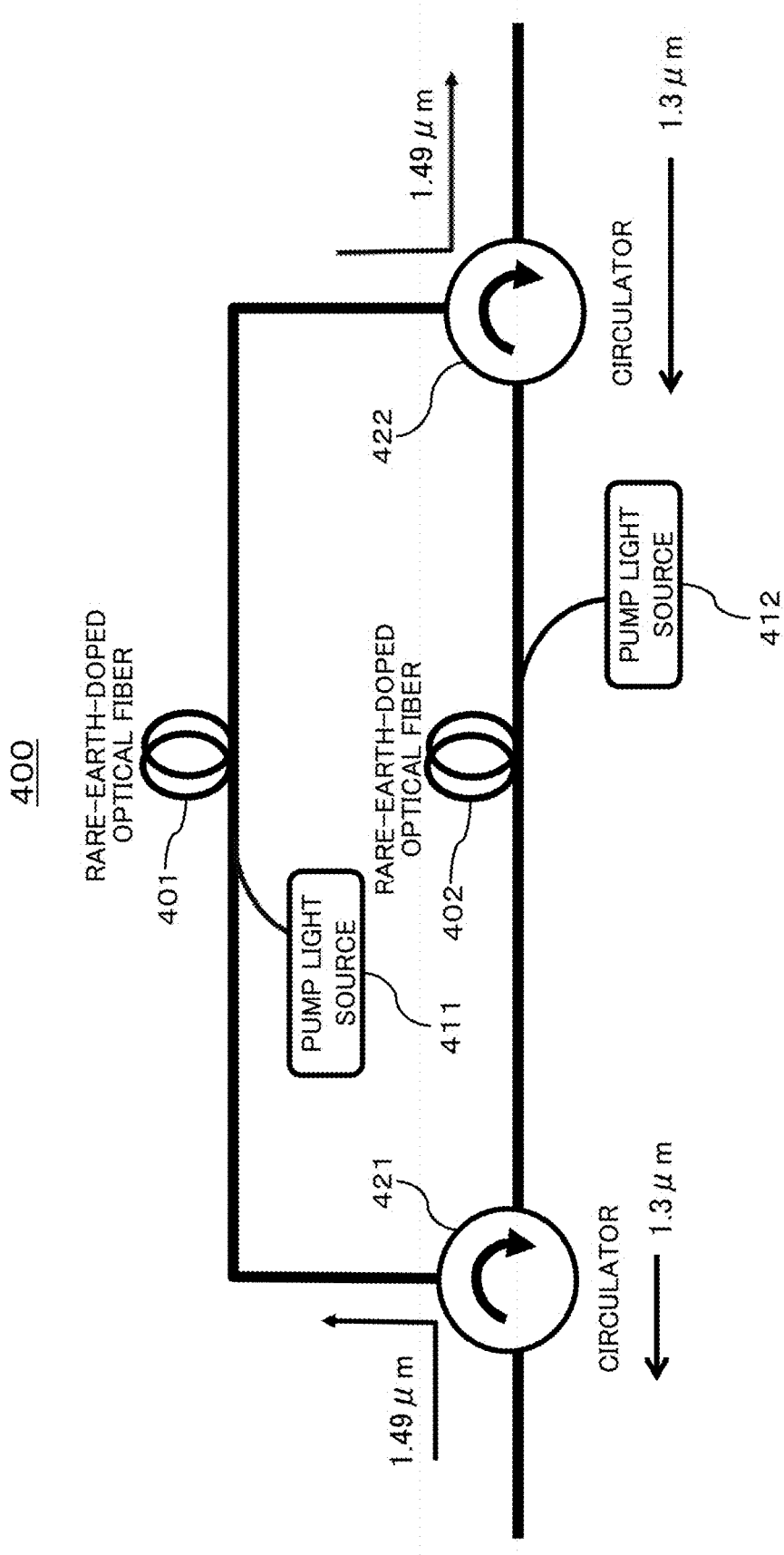
FIG. 24 is a block diagram illustrating a third comparative example with respect to the optical amplification repeater illustrated in FIGS. 1 to 20.

As illustrated in FIG. 24, the MUX/DMUXs 403 and 406 and the isolators 404, 405, 407 and 408 illustrated in FIG. 22 are not used, and instead a configuration by using circulators 421 and 422 to realize the same function of the optical amplification repeater 400 of FIG. 22 may also be considered.

However, similarly to the configuration illustrated in FIG. 22, a power supply system for the pump light sources 411 and 412 is necessary in the configuration illustrated in FIG. 24.

Fourth Comparative Example

Figure 25:
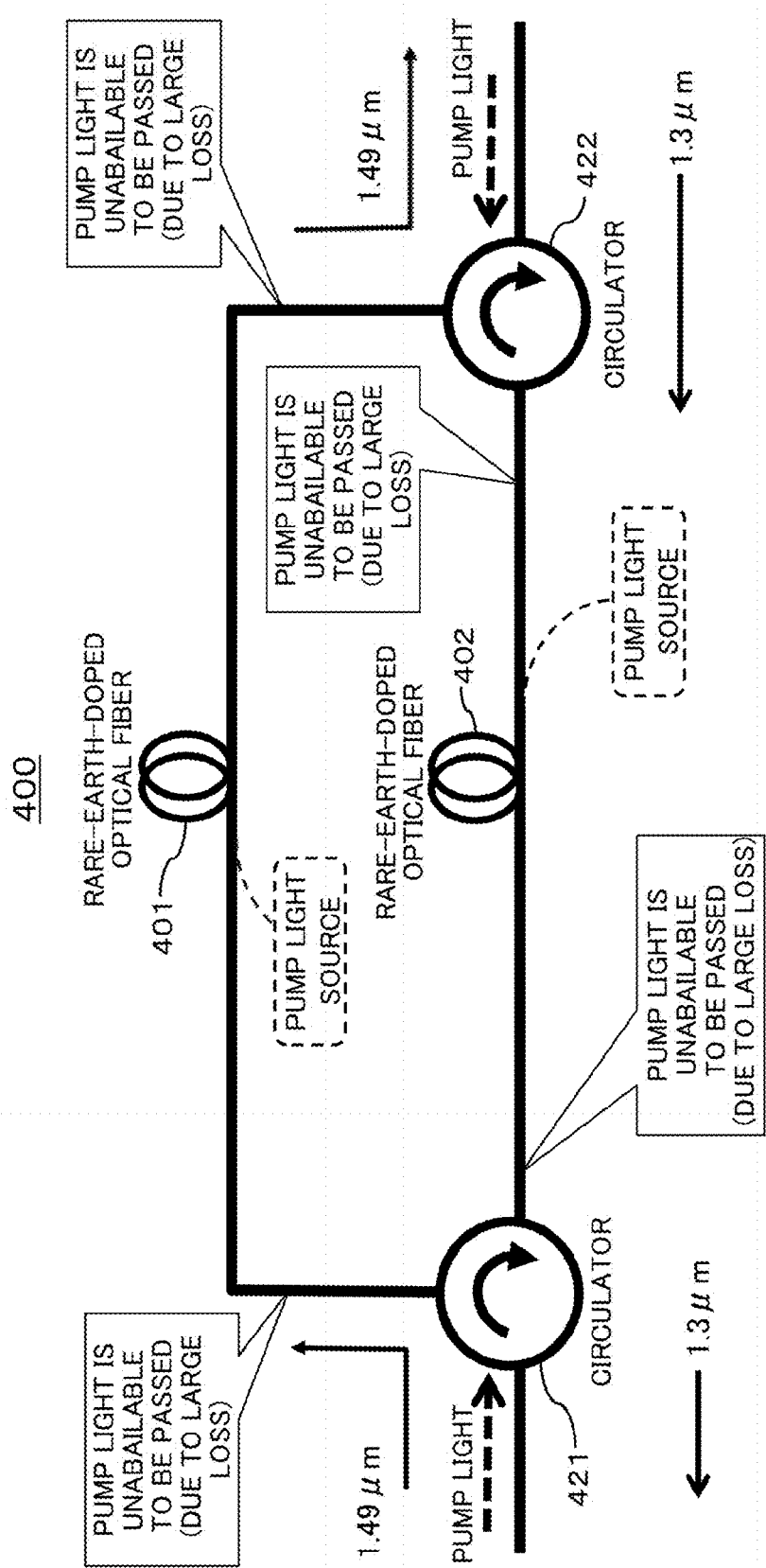
FIG. 25 is a block diagram illustrating a fourth comparative example with respect to the optical amplification repeater illustrated in FIGS. 1 to 20.

Therefore, similarly to the configuration illustrated in FIG. 23, the optical amplification repeater 400 with a remote pump configuration as illustrated in FIG. 25 may also be considered. In the remote pump configuration, the pump light sources 411 and 412 are removed from the configuration of FIG. 24. However, even in this configuration, the pump light is substantially unavailable to pass through the circulators 421 and 422 due to the wavelength dependency of the insertion loss (or bandwidth limitation) of the circulators 421 and 422, as described with reference to FIG. 6. Therefore, it is unavailable to remotely pump the rare-earth-doped optical fiber amplifiers 401 and 402.

Fifth Comparative Example

Figure 26:
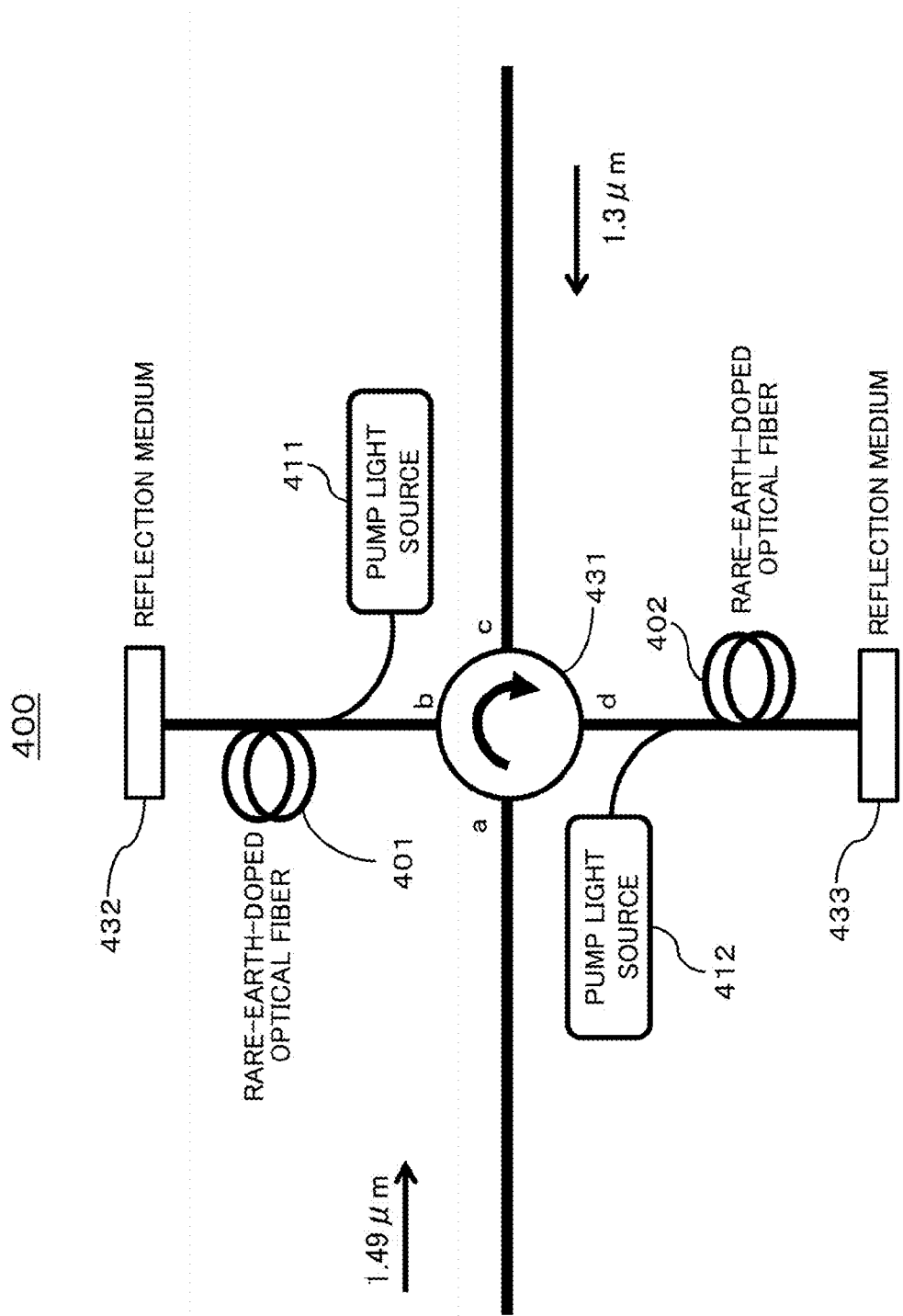
FIG. 26 is a block diagram illustrating a fifth comparative example with respect to the optical amplification repeater illustrated in FIGS. 1 to 20.

As a modification of the optical amplification repeater 400 using a circulator, a configuration as illustrated in FIG. 26 may be considered. In the optical amplification repeater 400 illustrated in FIG. 26, the downstream signal light and the upstream signal light are separated by using the directivity of a circulator 431, and the separated lights are individually amplified by the rare-earth-doped optical fiber amplifiers 401 and 402.

For example, the downstream signal light (with the 1.49-μm band wavelength) is guided to the port b from the port a of the circulator 431, and input to the rare-earth-doped optical fiber amplifier 401. The rare-earth-doped optical fiber amplifier 401 amplifies the signal light input from the port b of the circulator 431 by using the pump light input from the pump light source 411. The amplified signal light is reflected by a reflection medium 432 and is amplified by the amplifier 401 again. Thereafter, the amplified signal light is guided to the port c from the port b of the circulator 431.

Meanwhile, the upstream signal light (with the 1.3-μm band wavelength) is guided to the port d from the port c of the circulator 431 and is input to the rare-earth-doped optical fiber amplifier 402. The rare-earth-doped optical fiber amplifier 402 amplifies the signal light input from the port d of the circulator 431 by using the pump light input from the pump light source 412. The amplified signal light is reflected by a reflection medium 433 and is amplified by the amplifier 402 again. Thereafter, the amplified signal light is guided to the port a from the port d of the circulator 431.

In this way, the downstream and upstream signal lights can be amplified by the individual rare-earth-doped optical fiber amplifiers 401 and 402 in the optical amplification repeater 400 with the configuration illustrated in FIG. 26. However, even in this configuration, a power supply system for the pump light sources 411 and 412 is necessary.

Sixth Comparative Example

Figure 27:
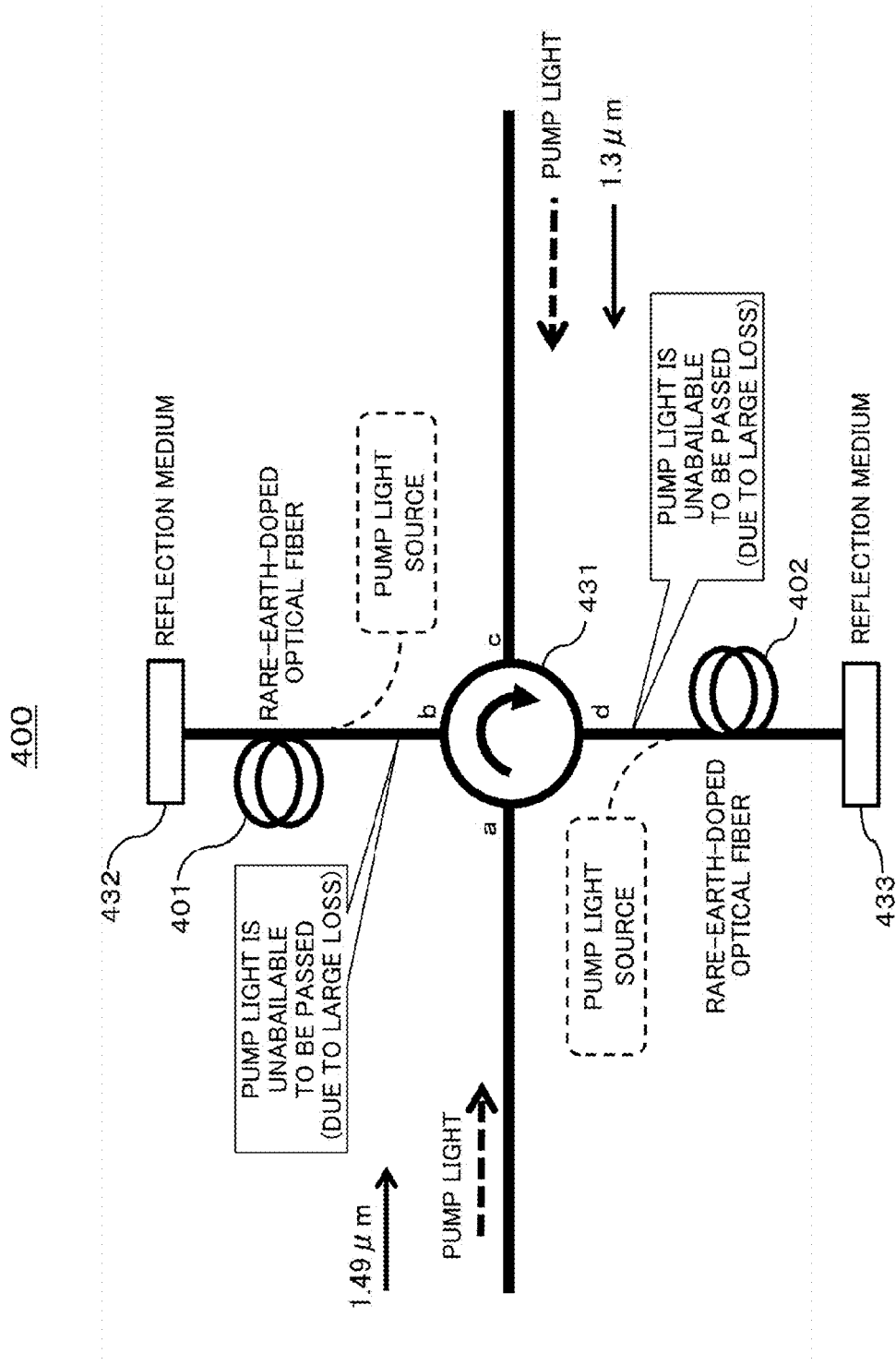
FIG. 27 is a block diagram illustrating a sixth comparative example with respect to the optical amplification repeater illustrated in FIGS. 1 to 20.

Therefore, similarly to the configurations illustrated in FIGS. 23 and 25, the optical amplification repeater 400 with the remote pump configuration as illustrated in FIG. 27 may also be considered. In this remote pump configuration, the pump light sources 411 and 412 are removed from the configuration of FIG. 26. However, even in this configuration, as described with reference to FIG. 6, the pump light is substantially unavailable to pass through the circulator 431 due to the wavelength dependency of the insertion loss (or bandwidth limitation) of the circulator 431. Therefore, it is unavailable to remotely pump the rare-earth-doped optical fiber amplifiers 401 and 402.

As described above, the power supply system for the pump light sources 411 and 412 are necessary in any of the first to sixth comparative example. Even in trying to realize the remote pump without using the power supply system, it is unavailable to realize the remote pump due to the directivity and the bandwidth limitation of insertion components such as the isolator and the circulator.

Seventh Comparative Example

The downstream signal light may be subjected to a distributed Raman amplification with the forward pump by using the pump light source provided in the OLT 2. However, the Raman amplification may amplify a band not necessary to be amplified, and therefore, transmission quality of the signal light may be decreased due to a non-linear effect, for example. Further, when the signal light band used in the PON system is subjected to the Raman amplification, a plurality of pump light wavelengths are necessarily multiplexed, and thus, it is unrealistic. Furthermore, since the pump light wavelengths used for the downstream signal light and the upstream signal light are different each other, it is unavailable to collectively and remotely pump the Raman amplifier from the OLT 2.

All examples and conditional language provided herein are intended for pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiment(s) of the present invention have been described in detail, it should be understood that the various changes, substitutions, and alterations could be made hereto without departing from the spirit and scope of the invention.

What is claimed is:

1. An optical amplification repeater comprising:
   a first rare-earth-doped optical amplification medium that amplifies a first signal light to be transmitted to a downstream;
   a second rare-earth-doped optical amplification medium that amplifies a second signal light to be transmitted to an upstream in a direction opposite to a direction of the downstream; and
   a pump light split and guide unit configured to split a pump light transmitted from an optical transmission line together with any of the first and second signal lights into a first split pump light and a second split pump light and to guide the first and second split pump lights to the first and second rare-earth-doped optical amplification mediums, respectively.

2. The optical amplification repeater according to claim 1, wherein
   the pump light split and guide unit includes
   a first demultiplexer configured to demultiplex the first signal light and a first pump light transmitted together with the first signal light,
   a first splitter configured to split the first pump light demultiplexed by the first demultiplexer into the first and second split pump lights,
   a first multiplexer configured to multiplex the first split pump light split by the first splitter and the first signal light demultiplexed by the first demultiplexer and to guide the multiplexed light to the first rare-earth-doped optical amplification medium,
   a second multiplexer configured to multiplex the second split pump light split by the first splitter and the second signal light and to guide the multiplexed light to the second rare-earth-doped optical amplification medium.

3. The optical amplification repeater according to claim 1, wherein
   the pump light split and guide unit includes
   a second demultiplexer configured to demultiplex the second signal light and a second pump light transmitted together with the second signal light,
   a second splitter configured to split the second pump light demultiplexed by the second demultiplexer into the first and second split pump lights,
   a third multiplexer configured to multiplex the first split pump light split by the second splitter and the first signal light and to guide the multiplexed light to the first rare-earth-doped optical amplification medium,
   a fourth multiplexer configured to multiplex the second split pump light split by the second splitter and the second signal light demultiplexed by the second demultiplexer and to guide the multiplexed light to the second rare-earth-doped optical amplification medium.

4. The optical amplification repeater according to claim 2, wherein
   the first splitter is a 1×N split coupler configured to split the first pump light into N (N is an integer of 3 or more) or more pump lights, and
   the optical amplification repeater further comprising:
   a fifth multiplexer configured to multiplex any of split pump lights other than the first and second split pump lights among the respective split pump lights split by the 1×N split coupler and the first signal light amplified by the first rare-earth-doped optical amplification medium, and to transmit the multiplexed light to the downstream.

5. The optical amplification repeater according to claim 2, wherein
   an isolator or a circulator serving as an insertion loss component is provided at input and output sides of the first and second rare-earth-doped optical amplification mediums,
   the first demultiplexer is provided at a front stage of the insertion loss component provided at the input side of the first rare-earth-doped optical amplification medium,
   the first multiplexer is provided between the insertion loss components provided at the input and output sides of the first rare-earth-doped optical amplification medium, and
   the second multiplexer is provided between the insertion loss components provided at the input and output sides of the second rare-earth-doped optical amplification medium.

6. The optical amplification repeater according to claim 3, wherein
   an isolator or a circulator serving as an insertion loss component is provided at each of input and output sides of the first and second rare-earth-doped optical amplification mediums,
   the second demultiplexer is provided at a front stage of the insertion loss component provided at the input side of the second rare-earth-doped optical amplification medium,
   the third multiplexer is provided between the insertion loss components provided at the input and output sides of the first rare-earth-doped optical amplification medium, and
   the fourth multiplexer is provided between the insertion loss components provided at the input and output sides of the second rare-earth-doped optical amplification medium.

7. The optical amplification repeater according to claim 1, wherein
   the pump light split and guide unit includes
   a pump light reflection medium configured to reflect a residual light of the first and second split pump lights guided into and passing through the first and second rare-earth-doped optical amplification mediums and to re-guide the residual light into the first and second rare-earth-doped optical amplification mediums, respectively.

8. The optical amplification repeater according to claim 1, wherein the first rare-earth-doped optical amplification medium is an erbium-doped optical fiber (EDF), and the second rare-earth-doped optical amplification medium is an praseodymium-doped optical fiber (PDF).

9. The optical amplification repeater according to claim 8, wherein the pump light transmitted together with any of the first and second signal lights has a wavelength available to pump amplification bands of the EDF and the PDF commonly.

10. The optical amplification repeater according to claim 9, wherein the wavelength of the pump light is a 0.98-μm band wavelength.

11. The optical amplification repeater according to claim 9, wherein the first signal light is light with a 1.49-μm band wavelength, and the second signal light is light with a 1.3-μm band wavelength.

12. An optical transmission station comprising:

an optical transmitter configured to transmit a first signal light to a downstream;

an optical receiver configured to receive a second signal light from an upstream;

a pump light source configured to transmit a pump light together with the first signal light to an optical amplification repeater, the optical amplification repeater amplifying the first signal light and the second signal light by using individual rare-earth-doped optical amplification mediums, the pump light remotely and commonly pumping the respective rare-earth-doped optical amplification mediums; and an optical attenuator configured to attenuate the second signal light input to the optical receiver according to power of the pump light transmitted together with the first signal light.

13. The optical transmission station according to claim 12, wherein the optical attenuator is a variable optical attenuator of which the optical attenuation amount is variable, the optical transmission station further comprising:

a controller configured to control power of the pump light to satisfy an allowable reception power of the first signal light at a subscriber station that receives the first signal light, and to control the optical attenuation amount to satisfy an allowable reception power of the second signal light at the optical receiver in response to the control.

14. The optical transmission station according to claim 13, wherein the second signal light includes a plurality of time slots to which signal lights transmitted from a plurality of subscriber stations are assigned, and the controller controls the optical attenuation amount in a unit of the time slot.

15. The optical transmission station according to claim 14, further comprising:

a second signal light splitter configured to split the second signal light input to the variable optical attenuator; and a delay line configured to delay one of the split signal lights split by the second signal light splitter with respect to the other split signal light split by the second signal light splitter, and to input the delayed split signal light to the variable optical attenuator, wherein the controller comprises a detector configured to detect power of the other split signal light split by the second signal light splitter for each of the time slots, and a control circuit configured to control the optical attenuation amount such that the power of the second signal light in each of the time slots detected by the detector satisfies the allowable reception power at the optical receiver, and wherein the delay line delays the second signal light by a delay amount according to a control response speed of the control circuit.

16. The optical transmission station according to claim 12, further comprising:

a first output port that outputs the first signal light from the optical transmitter; and a second output port that outputs a pump light from the pump light source, wherein the first output port is connected to a first input port of a first signal light splitter configured to split the first signal light according to the number of subscriber stations that receive the first signal light, and wherein the second output port is connected to a second input port of the first signal light splitter.

* * * * *